US008838374B2

(12) United States Patent  
Tan et al.

(10) Patent No.: US 8,838,374 B2
(45) Date of Patent: *Sep. 16, 2014

(54) AUTOMATIC CORRECTION OF PAST POSITION ERRORS FOR LOCATION AND INVENTORY TRACKING

(75) Inventors: Han-Shue Tan, Concord, CA (US); Jihua Huang, Richmond, CA (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 540 days.

This patent is subject to a terminal disclaimer.

(21) Appl. No.: 12/876,918

(22) Filed: Sep. 7, 2010

(65) Prior Publication Data

US 2010/0332125 A1 Dec. 30, 2010

Related U.S. Application Data

(63) Continuation-in-part of application No. 11/478,991, filed on Jun. 29, 2006, now Pat. No. 7,848,881.

(60) Provisional application No. 60/696,619, filed on Jul. 5, 2005.

(51) Int. Cl.
*G01C 21/00* (2006.01)
*G08G 1/123* (2006.01)

(52) U.S. Cl.
USPC .......... 701/408; 701/469; 701/472; 700/213; 340/995.25

(58) Field of Classification Search
USPC ................ 701/518–521, 469, 472, 501, 507, 701/518–5; 340/995.25, 995.28, 989, 340/539.13, 988, 995.1; 700/213–214, 700/228–229

See application file for complete search history.

(56) References Cited

U.S. PATENT DOCUMENTS

| 5,422,639 | A | * | 6/1995 | Kobayashi et al. | 340/988 |
| 6,253,154 | B1 | * | 6/2001 | Oshizawa et al. | 701/495 |
| 6,282,496 | B1 | * | 8/2001 | Chowdhary | 701/446 |
| 6,594,600 | B1 | * | 7/2003 | Arnoul et al. | 702/94 |

(Continued)

OTHER PUBLICATIONS

A combination of monocular CCD camera and inertial-sensor for range estimation; Derrouich, S. et al., IECON 02 [Industrial Electronics Society, IEEE 2002 28th Annual Conf. of the, vol. 3; Components, Circuits, Devices & Sys.; Computing & Processing; Power, Energy, & Industry Applicat., 10.1109/IECON.2002.118531;Pub. Yr.: 2002 , p. 2191-2196 vol. 3.*

(Continued)

*Primary Examiner* — Cuong H Nguyen
(74) *Attorney, Agent, or Firm* — McCracken & Frank LLC

(57) ABSTRACT

A method is provided for calibrating past position estimates from a positioning system that provides real-time position estimates of a mobile object. The method first stores the real-time position estimates, which as time goes by become past position estimates and naturally form a first past trajectory depicting the past movement of the mobile object. Subsequently, a calibrated past trajectory is determined, which includes calibrated past position estimates that correspond to the same time instances as the past positions in the first past trajectory. When real-time positions have low qualities, this method calibrates them at a later time by using (higher-quality) real-time positions both before and after them. Errors in the past positions are then corrected based on the calibrated past trajectory. When used with event detectors that indicate inventory transactions, this method can correct position errors associated with inventory events so as to improve the performance of inventory tracking.

14 Claims, 14 Drawing Sheets

(56) References Cited

U.S. PATENT DOCUMENTS

| | | | | |
|---|---|---|---|---|
| 6,801,850 | B1 * | 10/2004 | Wolfson | 701/410 |
| 6,895,329 | B1 * | 5/2005 | Wolfson | 701/410 |
| 6,965,827 | B1 * | 11/2005 | Wolfson | 701/454 |
| 6,968,271 | B1 * | 11/2005 | Wolfson | 701/411 |
| 7,016,781 | B1 * | 3/2006 | Wolfson | 701/410 |
| 8,493,442 | B2 * | 7/2013 | Fernandez et al. | 348/143 |
| 2007/0010940 | A1 * | 1/2007 | Tan et al. | 701/207 |
| 2007/0288141 | A1 * | 12/2007 | Bergen et al. | 701/38 |

OTHER PUBLICATIONS

Appearance-Guided Monocular Omnidirectional Visual Odometry for Outdoor Ground Vehicles; Scaramuzza, D.; Robotics, IEEE Transactions on; vol. 24, Issue: 5; Components, Circuits, Devices & Systems ; Computing & Processing; Geoscience ; Power, Energy, & Industry Appl.; Robotics & Control Sys., 10.1109/TRO.2008.2004490, Pub. 2008 , p. 1015-1026.*

International Search Report dated Jan. 24, 2012 for Application No. PCT/US11/50641.

* cited by examiner

AUTOMATIC CORRECTION OF PAST POSITION ERRORS FOR LOCATION AND INVENTORY TRACKING

CLAIM FOR PRIORITY

This application is a continuation-in-part of application Ser. No. 11/478,991 filed on Jun. 29, 2006, entitled "Automatic Past Error Corrections for Location and Inventory Tracking," which claims priority to U.S. Provisional Application Ser. No. 60/696,619 filed Jul. 5, 2005, both of which are incorporated by reference herein in their entirety.

BACKGROUND

1. Technical Field

The present invention relates to tracking the location of a mobile object, such as a container that is carried on ships, railroad cars or trucks, or stored in freight yards. The present invention provides an automatic means to correct positioning errors after real-time positions of the mobile object have been reported from a real-time positioning system.

2. Related Art

Position or location tracking is a crucial component of many inventory and resource monitoring and management systems. Typical location tracking systems employ real-time positioning sensors that continuously or periodically provide position solutions for location tracking. The "real-time" position solution indicates that such position data is computed or determined based on measurements only up to the time that this position data is computed or determined. Sensors or systems commonly acquire real-time locations of vehicles, equipment, or inventory based on principles of either triangulation or proximity with respect to known locations using various electronic positioning means such as a Global Positioning System (GPS), a Differential Global Positioning System (DGPS), a DGPS and Inertial Navigation System (INS) integrated system, a Real-time Locating System (RTLS), a RTLS/GPS integrated system, a RTLS/INS integrated system, transponders, an ultra wideband locating system, or some combinations of the above systems.

For example, U.S. Pat. No. 6,577,921 discloses a container tracking system that tracks the real-time positions of container handling equipments using GPS, INS and wireless communication. U.S. Pat. No. 6,657,586 describes an RTLS for locating objects, in which every object has a tag attached to it and every remote reader has a GPS receiver. U.S. Pat. No. 6,266,008 discloses a system and method for determining the location of freight containers in a freight yard by attaching GPS receivers to every container. U.S. Pat. No. 6,611,755 describes a timing control method for a fleet management system using a communication, status sensor and positioning system. U.S. Pat. No. 6,876,326 discloses a location tracking system using communication search mode ranging techniques.

Limitations in physics, however, generally prevent the real-time positioning systems from achieving 100% reliability or accuracy, especially in the constantly changing environment of heavy metal container yards. Examples of those limitations with respect to radio-wave positioning techniques such as GPS, DGPS, and RTLS include obstacles blocking line of sight position signals and signals reflected from nearby surfaces (creating multi-path errors). Further practical limitations in sensor technologies such as INS and other vehicle motion sensors include biases in measurements and poor signal-to-noise ratios due to environmental sources. These limitations result in common positioning errors such as inaccuracies, loss of position, or location drifts.

To overcome the physical and practical limitations, many real-time positioning systems employ complimentary sensors, or digital maps to improve accuracy and reliability. As an example, the complementary nature of INS and GPS is the main reason why GPS/INS or DGPS/INS integrated systems are popular. The high, long-term accuracy of GPS can be combined with the high output rate, robustness and reliability of INS to deliver superior positioning performance. The integration improves the real-time positioning performance statistically; that is, the integration typically reduces the variances of the position errors when the positioning sensors are subject to unfavorable operational conditions. However, no positioning system or method can guarantee a 100% real-time accuracy when the unfavorable conditions persist. In fact, a positioning error could be created and then propagate erroneous data into an inventory application.

In addition to INS, other sensors or techniques have been used to complement GPS for providing better measurements or estimations of the current positions. For example, U.S. Pat. Nos. 6,731,237, 6,697,736, 6,694,260, 6,516,272, 6,427,122, and 6,317,688 describe various techniques to integrate GPS systems with inertial sensors (e.g., gyros and accelerometers), altimeters, compass, or magnetometers to (statistically) improve either reliability or accuracy of real-time positioning. U.S. Pat. Nos. 6,766,247, 6,728,637, and 6,615,135 disclose specific methods to increase real-time positioning accuracy by incorporating map or route information in a GPS or other sensor. U.S. Pat. Nos. 6,826,478 and 6,615,136 disclose various techniques to increase the real-time GPS/INS positioning accuracy by incorporating additional sensor information or pre-stored map and location information. U.S. Pat. No. 6,853,687 describes a method to improve the real-time performance of the RTLS by incorporating magnetic field proximity-based pingers into the RFID tags.

These prior art methods focus on providing a real-time position solution that is the best estimate of the "current" position of a mobile object. Such a "real-time" position solution is resolved or computed based on measurements up to the time that this position data is referred to. To provide such a real-time position estimate, prior art methods use the real-time (i.e., the "current" or most recent) measurements from positioning sensors such as GPS and INS, the history information including previous measurements of the positioning sensors, and sometimes a pre-stored map or location information. Typically, model-based estimation (e.g., Kalman Filters) and other sensor fusion techniques are employed for the integration.

Errors or noise in the real-time position solutions are inevitable in practice. For example, even real-time position solutions from an expensive tightly-coupled DGPS/INS integrated system can drift away from the true positions when the mobile object on which the system is installed enters an "unfavorable" area with less than four GPS satellite coverage for a relatively long period of time. Thus, the real-time position estimates obtained when the mobile object is in the GPS-unfavorable area have a relatively low accuracy. When the mobile object comes out of such a GPS-unfavorable area, those previous (real-time) position estimates become past position estimates which are part of the history data. Meanwhile, the DGPS receiver begins to receive signals from more than four GPS satellites; therefore, the current real-time measurements become more accurate; as the prior art methods proceed to compute current real-time position estimates based on the new measurements and the history data (typically using only the last real-time position solution), the current real-time position estimates then have a higher accuracy as well. However, the past position estimates (i.e., the previous real-time position estimates) in the history data are not updated or modified based on the "current" higher-accuracy real-time position estimate. As a result, any error or noise in the previous (real-time) position solutions will remain.

In some applications, such as navigation systems and vehicle guidance systems, once a position estimate becomes obsolete, it is no longer important. For example, for a vehicle navigation system, advices such as turning left at the next intersection are based on the current position of the vehicle, not its position five seconds or minutes ago. If 4 seconds ago the vehicle was under an overpass and the GPS lost satellite signals, or even if the position estimate 4 seconds ago is several meters away from the true position, it no longer matters to the vehicle navigation system as long as the current position estimate is accurate. However, in other applications, such as a typical inventory or resource tracking environment, inaccurate position estimates, regardless current or previous, can propagate into widespread inventory or database errors if they are not corrected in time. This occurs especially when tracking the position of containers or vehicles in a warehouse, container yard, or rail yard where tracking signals can be blocked.

For example, a container handling equipment drops off Container A at time t(i); the positioning system provides a real-time position estimate P(i), which is then reported to the inventory management system. Accordingly, the inventory management system records that Container A is now at location P(i) in the inventory database. As time goes by, the positioning system continues to provide the real-time position estimates P(i+1), P(i+2), . . . for the subsequent time instances t(i+1), t(i+2), and so on, and the position estimate P(i) remains as the position estimate at time t(i). Therefore, if the "real-time" position estimate P(i) is inaccurate due to a relatively long period of GPS blockage, and the actual drop-off location is one container location away, this inaccurate position estimate P(i) would remain in the inventory database as the location of Container A. Since the prior art methods do not have the capability to correct position estimate P(i) after time instance t(i), the erroneous position estimate P(i) in the inventory database will not be corrected automatically. Instead, the resultant errors often require manual correction, creating delays in the operation.

If such position errors are not corrected in time, they can propagate and further corrupt the inventory database when the containers associated with the erroneous position estimates are moved without correction, resulting in often expensive corrective measures in resource management and inventory controls. Given the previous example, when the inventory management system sends a command for a pick-up operation of Container A, the command will specify to an operator that the location to pick up Container A is P(i); however, since P(i) is erroneous, the operator will not be able to find Container A at P(i). If another container, Container B, happens to be at location P(i), the operator may simply pick up Container B and proceed to the next command if he or she is not paying attention. As a result, the inventory management system will erroneously record all the subsequent operations that are actually related to Container B as operations on Container A. Similarly, the operations on Container A can be mistaken as the operation on another container. Thus, one single position error can propagate and corrupt the inventory database to a significant extent.

SUMMARY OF THE INVENTION

Since the prior art methods are designed to improve the accuracy of the current position estimate using history data, they do not have the capability to improve the accuracy of previous position estimates. It is therefore an objective of embodiments of the present invention to provide a system and method that evaluates and improves the accuracy of previous position estimates by using information available even after the determination of the previous position estimates. That is, given a position estimate P(i) corresponding to and determined at time instance t(i), the prior art methods only uses P(i) (and possible P(j), j<i) in determining the subsequent position estimates P(i+1) while, according to a first aspect of the present application, the subsequent position estimates P(i+1) (and P(i+2), P(i+3), and so on) are used to evaluate P(i) and correct errors in P(i) at a time after time t(i).

It is another objective of embodiments of the present invention to provide a method for correcting previous position estimates using only information collected during a current trip. As a result, the system and method in the present application is also different from some prior art that utilizes map information or pre-determined track information (if a mobile object is traveling along a known track like a train). First, this system and method relies only on the sensor measurements collected during the current trip; it does not need pre-stored map information or pre-determined track information. Second, this system and method, unlike the prior art, does not restrict the mobile object to travel on roads defined in the map or on pre-determined tracks. In fact, container handling equipment in a container shipping yard do not necessarily travel on routes especially when it is about to or just finished a container pickup or drop-off operation.

Embodiments of the present invention also provide an improved positioning method and system that, in addition to obtaining and reporting real-time position data, also automatically provide post-processing correction in a real-time fashion as data signals are received.

According to a first aspect of embodiments of the present invention, a method for calibrating past position estimates from a positioning unit or system that provides real-time position estimates of a mobile object is described. The method includes the following process steps. First, the real-time position data from the positioning unit are stored in a data storage unit. As the time goes by, these real-time position estimates become previous position estimates, i.e., past position estimates. Several stored past positions naturally form a first past trajectory that depicts the past movement of the mobile object. Subsequently, a calibrated past trajectory is then determined based on this past trajectory. This calibrated past trajectory includes calibrated past position estimates that correspond to the same time instances as the past positions in the first past trajectory. Thus, a calibrated past position in the calibrated past trajectory can be determined by using at least one of the previous real-time position estimates provided at an earlier time instance by the positioning system.

For example, during time t(k−n) to time t(k), the positioning system continuously provides real-time position estimates P(k−n), P(k−n+1), . . . , P(k); these position estimates are stored as they are generated by the positioning system. At time t(k), the first past trajectory would at least contain [P(k), P(k−1), . . . , P(k−n+1), P(k−n)]. The calibrated past trajectory can then be determined as [Pc(k), Pc(k−1), . . . , Pc(k−n+1), Pc(k−n)]. The calibrated past position Pc(k−i) can be determined by using previous real-time positions provided at times both before t(i) (such as P(k−i−1), P(k−i−2), . . . , P(k−n)) and after t(i) (such as P(k−i+1), P(k−i+2), . . . , P(k)). By using previous real-time position estimates both before and after its corresponding time instance, a calibrated past position (e.g., Pc(k−i)) can approximate the actual past position of the mobile object better than the respective previous real-time position (e.g., P(k−i)), because the previous real-time position (e.g., P(k−i)) was determined by only using information gathered up to time t(k−i) due to the nature of the real-time positioning. Accordingly, the calibrated past trajectory can depict the past movement of the mobile object more accurately than the first past trajectory.

The real-time position data or estimates can include a pair of position values corresponding to the mobile object's position in a two-degree-of-freedom coordinate system, a heading angle corresponding to traveling direction of the mobile object, and a traveling speed of the mobile object. The real-time position estimates can further include a confidence level indicating its accuracy and trustworthiness. In further embodiments, the real-time position estimates also include motion information of the mobile object, such as its angular velocity and/or its accelerations. The real-time position estimates can include values representing the position as well as motion (e.g., linear accelerations and/or velocities and angular velocities) in a three-degree-of-freedom coordinates.

Several different processes to determine the calibrated past trajectory are presented. In one embodiment, the generation of the calibrated past trajectory involves computing at least one temporary past trajectory based on mathematical models and combining the temporary past trajectories with the first past trajectory to generate the calibrated past trajectory. In another embodiment, the generation of the calibrated past trajectory involves first selecting a segment of the first past trajectory (e.g., based on the high confidence or trustworthiness level) and then computing a calibrated past trajectory based on the selected segment of the first past trajectory. The resultant calibrated past trajectory corresponds to the same time instances as the segment of the first past trajectory. In a third embodiment, the generation of the calibrated past trajectory includes iterations of computing temporary past trajectories until the temporary past trajectories satisfy pre-determined criteria. In the first iteration, a first temporary past trajectory is computed based on the selected segment of the first past trajectory; in each of the subsequent iterations the temporary past trajectory determined in the preceding iteration is used to determine a subsequent temporary past trajectory; the temporary past trajectory determined in the last iteration is the calibrated past trajectory.

Various embodiments provide different methods to compute the calibrated past trajectory. In some embodiments, models that depict movement of the mobile object are developed; these models take as inputs the past positions (i.e., the previous real-time positions) in the first past trajectory to compute the calibrated past trajectory. In other embodiments, the generation of the calibrated past trajectory uses estimation formulas that include mathematic terms accounting for accumulated effects of noise and errors in the first position estimates. In some embodiments, the noise and errors of the past positions in the first past trajectory are estimated by modeling them along with their propagation in the trajectory calibration process, and the estimates are then used to remove the noise and errors so as to provide a calibrated past trajectory that is more accurate than the first past trajectory. In other embodiments, parameters are calibrated to fit the calibrated past trajectory to match selected segments of the first past trajectory.

In embodiments where the real-time position estimates include confidence levels, the confidence levels are used in the generation of the calibrated past trajectory in ways such that the previous real-time positions that have higher confidence levels have more effects on the generation of the calibrated past trajectory.

In embodiments where the real-time position estimates include motion information (such as the angular velocity) of the mobile object, the angular velocity can be calibrated and then used to calibrate the heading angle of the first past trajectory. The calibrated heading angle is then used to compute the calibrated past trajectory. In some embodiments, the calibration of the heading angle involves estimating and approximately removing noise and errors in the heading angle and/or the angular velocity of the mobile object. The noise and errors could include a bias and a gain offset in the angular velocity, as well as an error in the heading angle of the most recent past position and the earliest past position in the first past trajectory. The estimation can be formulated as an optimization problem and employ optimization techniques to determine estimates of the noise and errors. In one embodiment, the calibration of the heading angles involves determining whether the mobile object was moving along a straight road or a curvy road based on the angular velocity in the past positions of the first past trajectory and fitting the calibrated past heading angles to the heading angles in the first past trajectory.

According to a second aspect of the present invention, the generation of the calibrated past trajectory can further comprise an iterative process of computing calibrated past trajectory until they are deemed trustworthy or a pre-defined number of iteration has been met. The iterative process includes the following process steps: (1) selecting a segment of the first past trajectory, (2) computing a calibrated past trajectory based on the selected segment of the first past trajectory, (3) evaluating the trustworthiness of the calibrated past trajectory, (4) outputting the calibrated past trajectory if the calibrated past trajectory is trustworthy, or extending the segment of the first past trajectory to include more first positions and continuing to next iteration to re-compute the calibrated past trajectory. The calibrated past trajectory computed in the last iteration is the calibrated past trajectory generated.

In some embodiments, the generated calibrated past trajectory is further integrated with calibrated past trajectories generated at earlier time instances to form an integrated past trajectory. If the calibrated past trajectory in the last iteration is still deemed as not trustworthy, the process labels it as such and waits at a later time instance to re-conduct the calibration so as to include new incoming real-time position estimates in the first past trajectory.

In one embodiment, the trustworthiness of the calibrated past trajectory is determined based on a deviation index that indicates differences between the first past trajectory and the calibrated past trajectory. In another embodiment, a smoothness index that can indicate smoothness of the calibrated past trajectory is used to determine the trustworthiness of the calibrated past trajectory. In yet another embodiments, consistency indexes are used to determined the trustworthiness; such consistency indexes may represent the consistency between a first travel distance based on the first past trajectory and a second travel distance based on the calibrated past trajectory, as well as the consistency between a first heading angle change based on the first past trajectory and a second heading angle change based on the calibrated past trajectory. In some embodiments, more than one of the above indexes can be used in combination to determine the trustworthiness of the calibrated past trajectory.

According to a third aspect of embodiments of the present invention, the method steps can be provided to correct errors in the first past trajectory based on the calibrated past trajectory. The calibrated past trajectory is first compared with the first past trajectory to identify the errors in the first past positions, and accordingly, correction data is generated and stored to correct the errors. In one embodiment, the identified errors are compared with pre-determined thresholds and only errors that exceed the pre-determined thresholds are corrected.

According to a fourth aspect of embodiments of the present invention, a position tracking system for tracking and correcting inventory positions is provided. The position tracking system includes a positioning unit associated with a mobile object for providing first position estimates of the mobile object in real time, a data storage unit for storing the first position estimates as first past positions, an event management module for detecting occurrences of events by employing event detection means, associating each event with a corresponding first position estimate that is provided when the event occurs, and generating a first event trajectory for the event based on the corresponding first position estimate, and a past trajectory generation module for generating calibrated event trajectories based on the first event trajectory, an error correction module for comparing the calibrated event trajectories from the past trajectory generation module with the first event trajectory to identify errors in the first past positions and generating correction data for correcting the errors.

The detailed description of the present application shall make it clear that this position tracking system is capable of identifying and correcting errors in the position data associated with events such as those related to inventory transactions. The system can, thus, provide an error correction data list for an inventory or database, reporting the inventory location and status errors or simply update the inventory.

BRIEF DESCRIPTION OF THE DRAWINGS

Other and further features, advantages, and benefits of the present application will become more apparent from the following description and appended claims, taken in conjunction with the following drawings.

DETAILED DESCRIPTION

Figure 1:
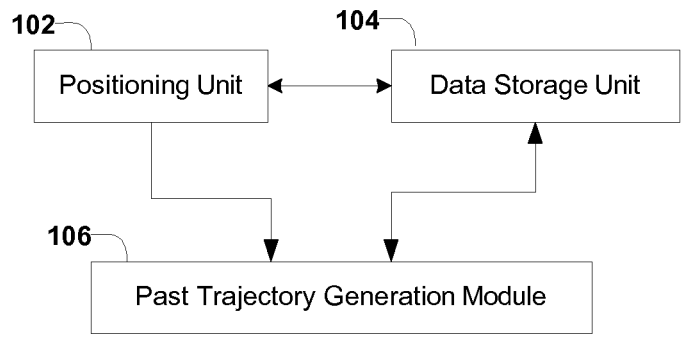
FIG. 1 shows the system configuration of a first embodiment of the position tracking system with past trajectory generation.

FIG. 1 shows the system configuration of a first embodiment of the position tracking system. In this embodiment, the position tracking system includes a positioning unit 102, a data storage unit 104, and a past trajectory generation module 106.

The positioning unit 102 provides real-time position estimates of a mobile object, where the real-time position estimates are determined based on the measurements up to the time that these position data are referenced. The positioning unit 102 can include but is not limited to the following positioning sensors: a single GPS or DGPS, an INS, motion sensors such as yaw rate sensor and/or speed sensor, cameras, radar and LIDAR. The positioning unit 102 could be installed on the mobile object (e.g., when GPS or DGPS, INS, or motion sensors are used), or it could be outside or away from the mobile object (e.g., when cameras, radars, LIDARs, or RTLS are used). The processing techniques involved in such a positioning unit include tightly-coupled GPS/INS integration, loosely-coupled GPS/INS integration, integration of GPS and camera-based positioning, GPS and motion sensor integration, GPS Real Time Kinematic (RTK) positioning, and other triangulation based positioning methods; those techniques are well-known to those skilled in the art and they are not detailed in the present application. Note that the position estimates from the positioning unit 102 may also be called as position measurements when the positioning unit 102 is regarded as a sensor system. In some simple embodiments where the positioning unit 102 includes a GPS or DGPS, the position estimates may indeed be the real-time measurements of the GPS or DGPS directly.

The real-time position estimates from the positioning unit 102 are then stored in the data storage unit 104 to form a first past trajectory that depicts the past movement of the mobile object. (As time goes by, the previous real-time position estimates become estimates of past positions; therefore, the stored real-time position estimates form a past trajectory and depict the past movement of the mobile object.) For example, at time t(i), the positioning unit 102 provides a real-time position estimate P(i) to the data storage unit 104 and the data storage unit 104 stores it. Subsequently, at times t(i+1), t(i+2), . . . , t(i+n), the positioning unit 102 provides and the data storage unit 104 stores the real-time position estimates P(i+1), P(i+2), ..., P(i+n), respectively. At and after time t(n), the stored (previous) real-time position estimates P(i) to P(i+n) depict the past movement of the mobile object between time t(i) and time t(i+n). That is, the previously determined real-time position estimates P(i) to P(i+n) become past position estimates (or measurements) that form a segment of the first past trajectory that correspond to the time t(i) and t(i+n).

At any time t(k), the first past trajectory includes the current real-time position estimate P(k) and previous real-time position estimates P(k-1), P(k-2), ..., and so on. The past trajectory generation module 106 determines a second past trajectory (also referred to as a calibrated past trajectory) based on the first past trajectory.

Figure 2:
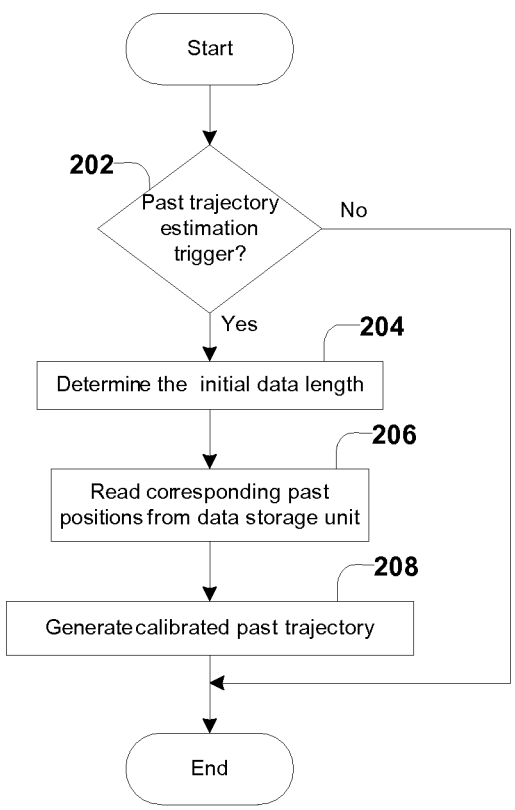
FIG. 2 shows the flowchart of one embodiment of the process for past trajectory generation.

FIG. 2 shows the flowchart of one embodiment of the past trajectory generation process executed by past trajectory generation module 106. The process starts with step 202 to check whether the past trajectory generation has been triggered. A basic trigger is based on whether a new real-time position estimate P(k) has been generated by the positioning unit 102. More sophisticated triggers could further include examining whether (1) the distance between the new real-time position estimate P(k) and the last real-time position estimate P(k-1) (e.g., $\|P(k)-P(k-1)\|$) differs significantly from the travel distance based on the traveling speed, and/or (2) the new real-time position estimate P(k) has a relatively high confidence level (if such a confidence level is also provided by the positioning unit), and/or (3) the first past trajectory (i.e., P(k), P(k-1), P(k-2), ...) is not smooth enough (e.g., a smoothness measure for the first past trajectory exceeds a pre-defined threshold), and so on. (More details on the smoothness measure will be provided later with reference to step 410 in FIG. 7.) If the past trajectory generation is not triggered, the process exits and waits until the next process cycle to start again at step 202; otherwise, the process continues to step 204.

In step 204 the process determines an initial data length n and in step 206 the process reads from the data storage unit the corresponding segment of the first past trajectory: [P(k), P(k-1), P(k-2), ..., P(k-n)]. That is, the segment of the first past trajectory, which includes position estimates P(k), P(k-1), P(k-2), ..., and P(k-n), will be used to generate the second past trajectory. Subsequently in step 208, the process generates calibrated past trajectory [Pc(k), Pc(k-1), Pc(k-2), ..., Pc(k-n)] based on the segment of the first past trajectory [P(k), P(k-1), P(k-2), ..., P(k-n)] by using mathematical filters, estimation formulas, and/or dynamic or kinematic models that depict the movement of the mobile object. Several embodiments are described below to illustrate how the calibrated past trajectory can be generated through steps 204 to 208. Although these embodiments use two-dimensional positions (i.e., x and y, together with a traveling angle) as examples, they can be easily extended to 3-dimensional positions (i.e., x, y and z, together with three angles for yaw, roll, and pitch motions).

A. Embodiments where the Position Estimates from the Positioning Unit 102 Include the Position and the Velocity of the Mobile Object In one embodiment, each position estimate in the first past trajectory, P(i), includes the position (P_x(i), P_y(i), P_theta(i)) and the velocity P_v(i), where P_x(i) and P_y(i) are the position at time t(i) in a pre-defined coordinate system (such as the longitude and latitude coordinates in the earth coordinate system), and P_theta(i) and P_v(i) are the traveling direction (also referred to as the heading angle) and the traveling velocity of the mobile object at time t(i), respectively. If no confidence level of the position estimates is available or if the confidence levels are not stored, the process treats all position estimates in the first past trajectory equal and the data length n determined in step 204 can be a pre-determined length L0. Thus, in step 206, the process reads from the Data Storage Unit 104 the corresponding segment of the first past trajectory: [P(k), P(k-1), ..., P(i), ..., P(k-n)], with n=L0.

In step 206, the process first generates a temporary past trajectory by projecting the movement of the mobile object backwards based on the most recent position estimate in the segment (i.e., P(k)). Such a backward projection can be based on a kinematic model of the movement or a dynamic model of the mobile object, such as a bicycle model for vehicles. For example, a kinematic model for forward projection on a two dimensional plane can be as follows, $$\begin{cases} x(i+1) = x(i) + v(i) \times \cos(\text{theta}(i)) \times \Delta t \\ y(i+1) = y(i) + v(i) \times \sin(\text{theta}(i)) \times \Delta t \end{cases}$$

the corresponding kinematic model for backward projection model can be $$\begin{cases} x(i-1) = x(i) - v(i) \times \cos(\text{theta}(i)) \times \Delta t \\ y(i-1) = y(i) - v(i) \times \sin(\text{theta}(i)) \times \Delta t \end{cases}$$

where $\Delta t$ is the update time of the position estimates P(i).

Thus, based on the backward kinematic model, a temporary past trajectory based on P(k) is generated as [Pt(k), Pt(k-1), Pt(k-2), ..., Pt(k-n)] with Pt(k)=P(k) as the initial condition for the backward projection. That is, the temporary past trajectory can be generated using the velocity P_v(i) and heading angle P_theta(i) from the first past trajectory [P(k), P(k-1), ..., P(i), ..., P(k-n)] (k≤i≤k-n):

$$\begin{cases} Pt_{x(i-1)} = Pt_{x(i)} - P_{v(i)} \times \cos(P_{theta(i)}) \times \Delta t \\ Pt_{y(i-1)} = Pt_{y(i)} - P_{v(i)} \times \cos(P_{theta(i)}) \times \Delta t. \end{cases}$$

Thus, the temporary past positions Pt(i) includes (Pt_x(i), Pt_y(i), Pt_theta(i)) and velocity Pt_v(i), with Pt_theta(i)= P_theta(i) and Pt_v(i)=P_v(i).

Alternatively, the velocity and the heading angle from the first past trajectory [P(k), P(k-1), ..., P(i), ..., P(k-n)] can be filtered to generate the velocity and the heading angle for the temporary past trajectory. That is, [P_v(k), P_v(k-1), ..., P_v(i), P_v(k-n)] is filtered to generate [Pt_v(k), Pt_v(k-1), ..., Pt_v(i), ..., Pt_v(k-n)] and [P_theta(k), P_theta(k-1), ..., P_theta(i), ..., P_theta(k-n)] is filtered to generate [Pt_theta(k), Pt_theta(k-1), ..., Pt_theta(i), Pt_theta(k-n)]. Typically, low-pass filters can be employed to remove noise which is typically of high frequency. More sophisticated filters and estimators can also be employed to specifically estimate and remove noise; such further embodiments are described later. The filtered velocity and heading angle are then used in the backward kinematic model to generate the temporary past trajectory [Pt(k), Pt(k-1), ..., Pt(i), ..., Pt(k-n)], and the temporary past positions Pt(i) includes (Pt_x(i), Pt_y(i), Pt_theta(i)) and velocity Pt_v(i), where the velocity Pt_v(i) and heading angle Pt_theta(i) are the filtered velocity and heading angle.

Hence, a calibrated past trajectory [Pc(k), Pc(k−1), ..., Pc(k−n)] can be generated by combining the first trajectory [P(k), P(k−1), ..., P(k−n)] with the temporary past trajectory [Pt(k), Pt(k−1), ..., Pt(k−n)]. For example, the combination can be a simple linear combination:

$$Pc(i)=a(i) \times P(i)+(1-a(i)) \times Pt(i)$$

where a(i) (0≤a(i)≤1) is a weighting factor. The weighting factor a(i) can be chosen to satisfy 1=a(k−n)>a(k−n+1)> ... >a(k−1)>a(k)=0 such that Pc(k−n)=P(k−n) and Pc(k)=Pt(k)=P(k).

Figure 3A:
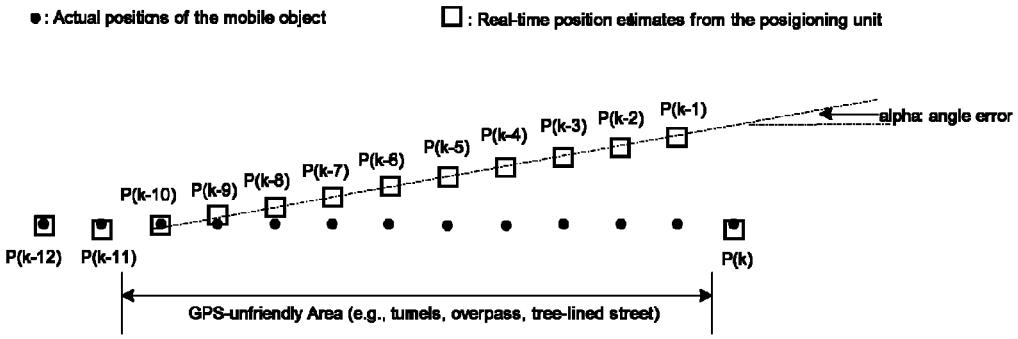
FIGS. 3A and 3B illustrate an example of the generation of a calibrated past trajectory based on the first past trajectory.
Figure 3B:
Figure 3B:
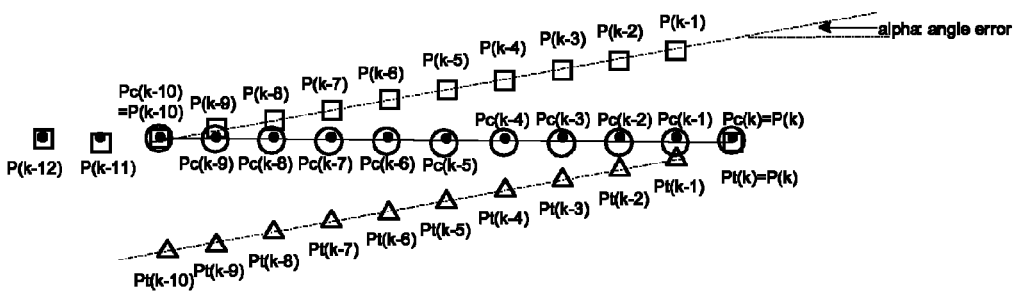

FIGS. 3A and 3B illustrate an example of the generation of the calibrated past trajectory. FIG. 3A shows the actual positions (marked as "•") and the real-time position estimates P(i) (marked as "□") of the mobile object between time t(k−12) and the current time instance t(k). It is assumed that, between time t(k−11) and the current time t(k), the mobile object was going straight through a GPS-unfavorable area such as tunnels, overpasses, and tree-lined or skyscraper-line streets. Therefore, the GPS signals could be blocked or degraded. In such cases, some GPS-based positioning unit may still provide position estimates based on the last accurate position estimate, which is P(k−11) in this example. Thus, the positioning unit basically assumes that the mobile object keeps the velocity and the heading angle of the last accurate position estimate: P_v(k−11) and P_theta(k−11). Typically, both the velocity (P_v(k−11)) and the heading angle (P_theta(k−11)) have errors, and FIG. 3A shows the position estimates when the error in the heading angle is "alpha". The larger the error in the heading angle is, the more the position estimates deviate from the actual positions.

At time t(k), the mobile object gets out of the GPS-unfavorable area and the position estimate P(k) is accurate again. However, the past position estimates, if uncorrected, would stay incorrect. Since the distance between P(k) and P(k−1) is large compared with the travel distance based on speed (i.e., $P_{v(k)} \times \Delta t$, where Δt=t(k)−t(k−1))), the past position estimation would be triggered at time t(k), and the first past trajectory would include P(k), P(k−1), P(k−2) ..., P(k−11), P(k−12), and so on. For simplicity of the description, it is further assumed the data length of the first past trajectory is determined to be 10, then the segment that is used to generate the calibrated past trajectory is [P(k), P(k−1), ..., P(k−10)].

Based on the embodiment described earlier, a temporary past trajectory [Pt(k), Pt(k−1), ..., Pt(k−10)] is generated using the simple kinematic model with Pt(k)=P(k) as the initial condition and Pt_theta(i)=P_theta(i). The temporary past trajectory is shown in FIG. 3B as "Δ". One characteristic of this embodiment is that the error in the heading angle itself is not corrected (since Pt_theta(i)=P_theta(i)); however, its effect on the first past trajectory is opposite to its effect on the temporary past trajectory, as shown in FIG. 3B. Therefore, by combining the temporary past trajectory [Pt(k), Pt(k−1), ..., Pt(k−10)] with the selected segment of the first past trajectory [P(k), P(k−1), ..., P(k−10)], the effects of the heading angle error can be reduced significantly. As shown in FIG. 3B, the calibrated past trajectory (labeled as "O"), which is the result of the combination, approximates the actual positions of the mobile object even by using such a simple kinematic model.

In another embodiment, instead of directly using the backward kinematic model to compute temporary past positions Pt(i), an estimator can be built based on the backward kinematic model to feedback the first positions P(i) in each backward projection step. One example is to use a Kalman filter based estimator as follows:

$$\begin{cases} Pt_{x(i-1)} = Pt_{x(i)} - P_{v(i)} \times \cos(P_{theta(i)}) \times \Delta t \\ Pt_{y(i-1)} = Pt_{y(i)} - P_{v(i)} \times \sin(P_{theta(i)}) \times \Delta t \end{cases}$$

and $$\begin{cases} Pt_{x(i-1)} = \widehat{Pt}_{x(i-1)} + k(i-1) \times (P_{x(i-1)} - \widehat{Pt}_{x(i-1)}) \\ Pt_{y(i-1)} = \widehat{Pt}_{y(i-1)} + k(i-1) \times (P_{y(i-1)} - \widehat{Pt}_{y(i-1)}) \end{cases}$$

where k(i−1) is the feedback gain. Similarly, the filtered velocity and heading angle can be used in the backward projection to compute $\widehat{Pt}_{x(i-1)}$ and $\widehat{Pt}_{y(i-1)}$. The temporary past positions Pt(i) can then be combined with the first positions to generate the calibrated past positions as described before, or they can be regarded as the calibrated past positions without the combination since their derivation already includes the feedback of the first positions.

In the above embodiments, the calibrated past trajectory is generated by first computing one or two temporary past trajectories and then combining the temporary past trajectories with the first past trajectory. In other embodiments, the calibrated past trajectory can be generated directly based on the first past trajectory, e.g., by feeding back the position estimates in the first past trajectory using model-based estimators such as Kalman filters. In some of those embodiments, backward estimation and forward estimation can be employed in an iterative fashion. In the first iteration, a backward estimation is used to derive a first temporary past trajectory by feeding back the first past trajectory using gains associated with the confidence level, and then a forward estimation is used to derive a second temporary past trajectory by feeding back the first temporary past trajectory. This second temporary past trajectory is then used in the subsequent iterations to generate subsequent temporary past trajectories until the generated temporary past trajectories converge or the temporary past trajectory matches well with the first positions with high confidence levels. The resultant temporary past trajectory is then outputted as the calibrated past trajectory.

B. Embodiments where the Position Estimates from the Positioning Unit 102 include the Position and the Velocity of the Mobile Object, as Well as a Confidence Level of Each Real-time Position Estimate In a further embodiment, the positioning unit can also provides a confidence level of each real-time position estimate. For example, GPS or DGPS typically provides information such as Dilution of Precision (DOP) and number of satellites that are visible to the GPS receiver; such information indicates the confidence level of the GPS or DGPS positions. Other GPS systems may provide error covariance that would indicate the confidence level of the solutions. By storing the confidence level as part of the position estimate P(k) in the Data Storage Unit 104, the position estimates in the first past trajectory, P(i), further include a confidence level P_conf (i), and the second past trajectory can be generated by incorporating this confidence level. When the positioning unit provides a new real-time position estimate P(k) and its corresponding confidence level P_conf(k) is above a pre-set threshold, the process will continues from step 202 to generate a second past trajectory (i.e., the calibrated past trajectory) in steps 204 through 208.

In step 204, with the confidence level available, the initial data length n can be set to be the minimum length Lmin that satisfies (1) Lmin is greater than a pre-determined length L0 and (2) P_conf(k−Lmin), the confidence level of P(k−Lmin), is greater than a pre-determined confidence level threshold (i.e., the position estimate P(k−Lmin) should have a relatively high confidence level). An upper bound LN can be also be used so that, if all positions P(k−m) (L0<m<LN) have confidence levels lower than the pre-determined confidence level threshold, the minimum length Lmin is determined such that P(k−Lmin) (L0<=Lmin<=LN) has the highest confidence level among P(k−m) (L0<m<LN).

With the initial data length n determined as Lmin, the process reads the corresponding segments of the first past trajectory: [P(k), P(k−1), . . . , P(i), . . . , P(k−n)] (with n=Lmin). A temporary past trajectory [Pt(k), Pt(k−1), . . . , Pt(i), . . . , Pt(k−n)] can be generated based on a backward projection or as described earlier. Alternatively, the temporary past trajectory can be generated by a backward running Kalman filter using P(k−n) as the initial condition and the filter gains being determined based on the confidence level. Similarly, a calibrated past trajectory [Pc(k), Pc(k−1), . . . , Pc(k−n)] can be generated by combining the first past trajectory [P(k), P(k−1), . . . , P(k−n)] with the temporary past trajectory [Pt(k), Pt(k−1), . . . , Pt(k−n)].

In a second embodiment with the confidence level available, the combination can incorporate the confidence levels of the position estimates in the first past trajectory. As the temporary past trajectory is generated based on the backward projection model and the most recent position estimate (i.e., Pt(k)=P(k)), the temporary past trajectory has confidence levels associated with P_conf(k) (the confidence level of position estimate P(k)). For example, the confidence level of every temporary past position Pt(i) can be set to be P_conf(k); alternatively, the confidence level of Pt(i) can decrease as (k−i) increases to take into consideration model inaccuracies and uncertainties:

$$Pt_{conf(i)} = P_{conf(k)} \times \gamma^{(k-i)}, \text{ where } 0<\gamma\le1 \text{ (e.g. } \gamma=0.95)$$

Accordingly, a linear combination of the first past trajectory and the temporary past trajectory can use weighting factors ($\beta(i)$) that are functions of both the confidence levels of the first past trajectory and the confidence levels of the second past trajectory.

$$Pc(i)=\beta(i)\times P(i)+(1-\beta(i))\times Pt(i),$$

where $\beta(i)=f(Pconf(i), Ptconf(i), a(i))$, and $$1 \ge a_{max} = a(k-n) > a(k-1+1) > \ldots > a(k-1) > a(k)=0$$

For example, the weighting factors can be chosen to be $$\beta(i) = \frac{a(i) \times P_{conf(i)}}{(a(i) \times Pconf(i) + (1-a(i)) \times Pt_{conf(i)})}.$$

Therefore, the larger $a(i) \times P_{conf(i)}$ is, the larger $\beta(i)$ is. Since $a(i)$ is larger as time t(i) gets closer to time t(k−n), this indicates that $\beta(i)$ is larger if time t(i) is closer to time t(k−n) and the confidence level P_conf(i) is higher. Consequently, the calibrated past position Pc(i) is closer to the real-time position P(i) if time t(i) is closer to time t(k−n) and the confidence level P_conf(i) is higher. Similarly, the closer time t(i) is to time t(k) (the time corresponding to the most recent position estimate P(k)) and the higher the confidence level Pt_conf(i), the higher $(1-\beta(i))$ is and the closer the calibrated past position Pc(i) is to the temporary past position Pt(i), which is derived based on position estimate P(k). In particular, since $\beta(k)=0$, Pc(k)=Pt(k)=P(k). And if $a_{max}$ is set to be 1, then $\beta(k-n)=1$ and Pc(k−n)=P(k−n). In other words, the calibrated past trajectory has the same positions at the beginning and the end of the segment as the selected segment of the first past trajectory.

In a third embodiment with the confidence level available, the first past trajectory can be further evaluated and portions of first past trajectory can be selected based on its corresponding confidence levels. Take an example where n=Lmin=20 and let's assume that, in the first past trajectory [P(k), P(k−1), . . . , P(i), . . . , P(k−n)], only [P(k), P(k−1)], [P(k−5), P(k−6), P(k−7)], P(k−10), [P(k−14), P(k−15)], and [P(k−19), P(k−20)] have confidence levels higher than a pre-defined threshold. Thus, only these first position estimates are selected to be used in the combination to generate the calibrated past trajectory. That is, if P(i) is among the selected first position estimates, the corresponding position in the calibrated past trajectory, Pc(i) is computed as: $Pc(i)=\beta(i) \times P(i)+(1\beta(i) \times Pt(i))$; if P(i) is not among the selected first position estimates (that is, P(i) has a confidence level lower than the pre-defined threshold), Pc(i) is simply set to be the Pt(i): Pc(i)=Pt(i). Variations or modifications of such a combination will be obvious to those skilled in the art.

In a fourth embodiment with the confidence level available, a second temporary past trajectory can be generated by a forward projection based on P(k−n) as well as the filtered heading angle and the filtered velocity. Similarly, estimation methods such as Kalman filters can also be applied to derive backward and forward estimators based on the backward and forward projection models, respectively, and these estimators can be used to derive the temporary trajectory and the second temporary trajectory, respectively. This second temporary trajectory can be denoted as [Pt2(k), Pt2(k−1), . . . , Pt2(i), . . . , Pt2(k−n)], and the calibrated past trajectory can be generated by combining the first past trajectory, the temporary trajectory, and the second temporary trajectory. An exemplarity combination is given as follows:

$$Pc(i)=\beta1(i)\times P(i)+\beta2(i)\times Pt(i)+\beta3(i)\times Pt2(i),$$

where $(\beta1(i)+\beta2(i)+\beta3(i))=1$. The weighting factors can be:

$$\beta1(i) = \frac{a(i) \times P_{conf(i)}}{\begin{pmatrix} a(i) \times P_{conf(i)} + \\ (1-a(i)) \times Pt_{conf(i)} \end{pmatrix} + (1-a(i) \times Pt2_{conf(i)})}$$

$$\beta2(i) = \frac{(1-a(i)) \times P_{conf(i)}}{\begin{pmatrix} a(i) \times P_{conf(i)} + \\ (1-a(i)) \times Pt_{conf(i)} \end{pmatrix} + (1-a(i) \times Pt2_{conf(i)})}$$

$$\beta3(i) = \frac{(1-a(i)) \times Pt2_{conf(i)}}{\begin{pmatrix} a(i) \times P_{conf(i)} + \\ (1-a(i)) \times Pt_{conf(i)} \end{pmatrix} + (1-a(i) \times Pt2_{conf(i)})}$$

As will be shown later with FIGS. 5 to 7, the filtered heading angle and filtered velocity can also be obtained by first formulating the error terms as an mathematical equations in the angular velocity and speed measurement in the dynamic state equations of the position estimation, and then solving the error terms via minimizing the weighted least squares sum of the position estimation errors using the confidence levels as the associated weight functions.

C. Embodiments where the Position Estimates from the Positioning Unit 102 Further include the Angular Velocity, in Addition to the Position and the Velocity of the Mobile Object In the embodiments described so far, the first past trajectory is formed by storing the real-time position estimates P(i), which include the estimated position (P_x(i), P_y(i), P_theta (i)) and the estimated velocity P_v(i). In some simple embodiments where the positioning unit 102 includes a GPS or DGPS, the position estimates can be the real-time measurements of the GPS or DGPS directly. In some other embodiments, the positioning unit 102 can further include one or more motion sensors such as speed sensor, yaw rate sensor, and/or inertial measurement unit (IMU) that measures accelerations and angular speeds in multiple directions. With this information from the motion sensors, the real-time position estimates can be generated based on measurements from both the positioning sensor and the motion sensors. Various techniques, such as tightly-couple DGPS/INS integration (which requires a complete IMU in the positioning unit 102) and loosely-couple DGPS/INS integration, can be used to generate such a real-time position estimate, and they are well-known to those skilled in the art. Accordingly, the first past trajectory can be formed by storing both the real-time position estimate and the motion sensor information; therefore, the determination of the calibrated past trajectory can further incorporate information from one or more motion sensors.

In one embodiment, the positioning unit 102 includes a positioning sensor, a speed sensor, and an angular velocity sensor. The following description exemplifies a 2-dimensional positioning technique, and it can be extended to the 3-dimensional case. The positioning sensor provides the real-time position measurement (P_mx(i), P_my(i), P_mtheta(i)), the velocity P_mv(i), while the speed sensor provides the velocity measurement v(i) and the angular velocity sensor provides the angular velocity measurement w(i). The positioning unit 102 therefore generates the real-time position estimate P(i) based on the real-time position measurement (P_mx(i), P_my(i), P_mtheta(i)) as well as the motion sensor measurement v(i) and w(i), where the real-time position estimate P(i) then includes (P_x(i), P_y(i), P_theta(i)) and P_v(i).

Thus, the first past trajectory includes both the real-time position estimate P(i) and the motion sensor measurement v(i) and w(i); that is, a history of the real-time position estimate, [P(k), P(k−1), . . . , P(i), . . . , ], and a history of motion sensor measurements, [v(k), v(k−1), . . . , v(i), . . . ] and [w(k), w(k−1), . . . , w(i), . . . ], are established to depict the past movement of the mobile object. To generate the calibrated past trajectory at time t(k), the initial data length n can be determined as described in step 204. A calibrated past trajectory is then determined in step 208 based on the first past trajectory by using mathematical filters or estimation formulas to provide better estimates of the past positions, especially when position errors occurred.

C1. Embodiment with Extended Models to Incorporate Motion Sensor Information for Generating the Calibrated Past Trajectory In a first embodiment with the motion sensor information available, the models for depicting the motion of the mobile object can be expanded. An extended kinematic model for forward projection is as follows:

$$\begin{cases} \text{theta}(i+1) = \text{theta}(i) + w(i) \times \Delta t \\ x(i+1) = x(i) + v(i) \times \cos(\text{theta}(i)) \times \Delta t \\ y(i+1) = y(i) + v(i) \times \sin(\text{theta}(i)) \times \Delta t. \end{cases}$$

The corresponding kinematic model for backward projection is $$\begin{cases} \text{theta}(i+1) = \text{theta}(i) + w(i) \times \Delta t \\ x(i-1) = x(i) - v(i) \times \cos(\text{theta}(i)) \times \Delta t \\ y(i-1) = y(i) - v(i) \times \sin(\text{theta}(i)) \times \Delta t. \end{cases}$$

Accordingly, a temporary past trajectory [Pt(k), Pt(k−1), . . . , Pt(i), . . . , Pt(k−n)] can be generated based on the backward projection model with Pt(k)=P(k) (i.e., [Pt_x(k), Pt_y(k), Pt_theta(k)]=[P_x(k), P_y(k), P_theta(k)]) as the initial condition and the motion sensor measurements v(i) and w(i) as the estimated velocity Pt_v(i) and angular velocity Pt_w(i). That is:

$$\begin{cases} Pt_{theta(i+1)} = Pt_{theta(i)} - Pt_{w(i)} \times \Delta t \\ Pt_{x(i-1)} = Pt_{x(i)} - v(i) \times \cos(Pt_{theta(i)}) \times \Delta t \\ Pt_{y(i-1)} = Pt_{y(i)} - v(i) \times \sin(Pt_{theta(i)}) \times \Delta t, \end{cases}$$

with $$\begin{cases} Pt_{v(i)} = v(i) \\ Pt_{w(i)} = w(i), \end{cases}$$

starting with i=k and ending with (i−1)=(k−n). Alternatively, the estimated velocity Pt_v(i) and Pt_w(i) can be filtered motion sensor measurements; for example, low-pass filters can be used to reduce the noise in the measurements and bias estimation techniques such as recursive least-square estimation can be used to estimate and approximately remove the sensor bias.

C2. Embodiment with Estimation Formulas that Include Mathematic Terms or Parameters to Account for the Accumulated Effects of the Noise and Errors in the Position Estimates In a second embodiment with the motion sensor information available, the estimation formulas may further include mathematic terms or parameters that account for the accumulated effects of the noise and errors in the position estimates. An example is to use Kalman filters or variations of Kalman filters to feedback the previous real-time position estimates in the first past trajectory and the (filtered) motion sensor measurements in the backward projection. The estimation formula becomes the following:

$$\begin{cases} Pt_{theta(i+1)} = Pt_{theta(i)} - Pt_{w(i)} \times \Delta t \\ Pt_{x(i-1)} = Pt_{x(i)} - Pt_{v(i)} \times \cos(Pt_{theta(i)}) \times \Delta t \\ Pt_{y(i-1)} = Pt_{y(i)} - Pt_{v(i)} \times \sin(Pt_{theta(i)}) \times \Delta t \end{cases}$$

and $$\begin{bmatrix} Pt_{theta(i-1)} \\ Pt_{x(i-1)} \\ Pt_{y(i-1)} \end{bmatrix} = \begin{bmatrix} Pt_{theta(i-1)} \\ Pt_{x(i-1)} \\ Pt_{y(i-1)} \end{bmatrix} + H_{ax3}(i-1) \times \left( \begin{bmatrix} Pt_{theta(i-1)} \\ Pt_{x(i-1)} \\ Pt_{y(i-1)} \end{bmatrix} - \begin{bmatrix} Pt_{theta(i-1)} \\ Pt_{x(i-1)} \\ Pt_{y(i-1)} \end{bmatrix} \right)$$

where $H_{3\times 8}(i-1)$ is a three-by-three matrix computed based on Kalman filter formulas. The variance characteristics of the position estimate [P_x(i−1), P_y(i−1), P_theta(i−1)] can be further linked to the confidence level of the position estimate to affect the matrix $H_{3\times 8}(i-1)$. For example, the higher the confidence level, the smaller the variance and thus the larger the matrix $H_{3\times6}(i-1)$ to allow more feedback based on the previous real-time position estimate $P(i-1)$.

C3. Embodiment with Estimation Formulas that Include Noise and Error Models that Describe the Propagation of the Noise and Error in the Trajectory Calibration Process The estimation formulas can further include noise and error models describing the propagation of the noise and error in the trajectory calibration process. Inertia sensors, such as angular velocity sensors and accelerometers, typically suffer from sensor biases, as they may not have been calibrated correctly, resulting in an offset in the sensor's input-output gain. Furthermore, the error in the initial heading angle (P_theta(k)) typically has a larger impact than errors in P_x(k) and P_y(k) on the accuracy of the past trajectory generated.

In one embodiment, the error model for the angular velocity sensor can be written as $$Pt_{w(i)} = \gamma(i) \times w(i) + w_{bias(i)},$$

where $\gamma(i)$ is the gain factor and $w_{bias(i)}$ is the sensor bias. A simplification is to make both $\gamma(i)$ and $e_{w(i)}$ constant since they typically vary very slowly: $Pt_{w(i)} = \gamma \times w(i) + w_{bias(i)}$.

Similarly, the error associated with the initial heading angle is written as $$Pt_{theta(k)} = P_{theta(k)} + \text{error}_{theta}.$$

Using the above error models together with the same backward projection model, $$\begin{cases} Pt_{theta(i-1)} = Pt_{theta(i)} - Pt_{w(i)} \times \Delta t \\ Pt_{x(i-1)} = Pt_{x(i)} - Pt_{v(i)} \times \cos(Pt_{theta(i)}) \times \Delta t \\ Pt_{y(i-1)} = Pt_{y(i)} - Pt_{v(i)} \times \sin(Pt_{theta(i)}) \times \Delta t \end{cases}$$

the generation of the temporary past trajectory can be formulated as an optimization problem, which is to find the error terms (w_bias and error_theta) as well as the gain factor $\gamma$ so as to minimize a cost function such that the temporary past trajectory fit well with the higher confidence part of the first past trajectory. An exemplary cost function is as follows:

$$\text{Cost} = \sum_{k-n}^{k} P_{conf(i)} \times \left\| \begin{bmatrix} P_{x(i)} \\ P_{y(i)} \end{bmatrix} - \begin{bmatrix} Pt_{x(i)} \\ Pt_{y(i)} \end{bmatrix} \right\|.$$

An alternative cost function is to include only the part where the confidence level is higher than a threshold (i.e., P_conf(i) must be greater than a threshold).

The above optimization problem can be solved by various techniques; such techniques are well-known to those skilled in the art and therefore are not described here. Alternatively, the error terms can be approximately estimated by using an iteration process as follows. First, a range is set for each of the error terms, error_theta, $\gamma$, and w_bias. These ranges can be determined based on the characteristics of the sensors, and for the heading angle error error_theta, the confidence level of P(k) can be used as well. (That is, the higher the confidence level P_conf(k), the smaller the range for error_theta.) Second, grids are set for each range and a temporary past trajectory is determined by using the values at each grid point for the error terms. For example, if the range for e_theta is from −3 to 3, and grids are set to be 1 apart, then there could be 7 values for e_theta: [−3, −2, −1, 0, 1, 2, 3]. Similarly, if the values for e_w is [−1, −0.5, 0, 0.5, 1] and for $\gamma$ is [0.9, 0.95, 1, 1.05, 1.1], then there are a total of 7×5×5=175 grid points. And there will be 175 temporary past trajectories determined, with one temporary past trajectory for error terms at one grid point. Third, the corresponding cost function is computed for each of the temporary past trajectories, and the error terms whose corresponding temporary past trajectory achieves the smallest cost function are regarded as the approximate estimate of the sensor errors.

Thus, the calibrated past trajectory can be generated by estimating and calibrating the noise and error terms to result in a past trajectory more accurate than the first past trajectory. The error terms that achieve the minimum value of the cost function are regarded as the best estimate of the sensor errors and the corresponding temporary past trajectory can be regarded as the calibrated past trajectory or be combined with the first past trajectory to generate the calibrated past trajectory as described before. As will be described later with respect to FIG. 7, the minimum value of the cost function can be used as a measure of the trustworthiness of the generated calibrated past trajectory.

Figure 4:
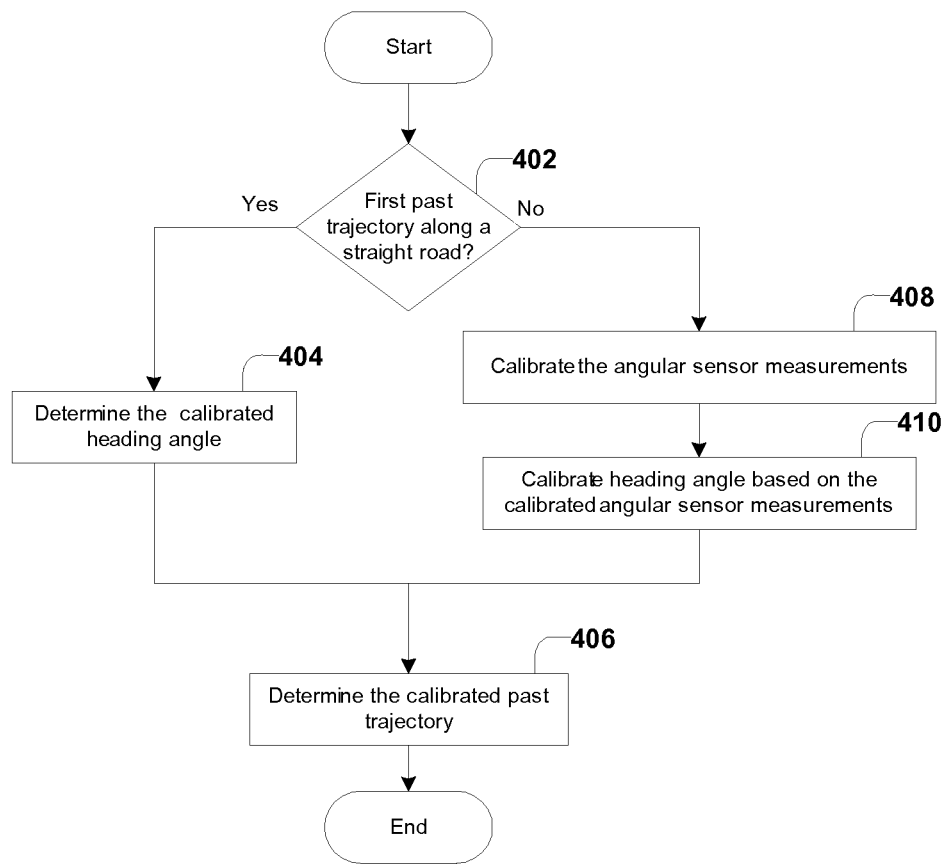
FIG. 4 shows the flowchart of one embodiment of the generation of a calibrated past trajectory, which further includes generating and fitting temporary trajectories by calibrating parameters to match the selected segments of the first past trajectory.

C4. Embodiment with Calibration of Parameters to Match the Calibrated Past Trajectory to the Selected Segment of the First Past Trajectory FIG. 4 shows the flowchart of one embodiment of the process involved in step 208, where the generation of a calibrated past trajectory further includes generating and fitting temporary trajectories by calibrating parameters to match the selected segments of the first past trajectory. Given the data length determined as n and the selected segment of the first past trajectory as [P(k), P(k−1), . . . , P(i), . . . , P(k−n)], the process first examines whether the selected segment of the first past trajectory corresponds to movement along a straight or relatively straight road in step 402.

The criteria that can be used in this determination may include (1) the maximum angular velocity in the selected segment is small (e.g., smaller than a pre-determined threshold) and/or (2) the difference between the maximum heading angle and the minimum heading angle is small (e.g., smaller than a pre-determined threshold). The heading angle P_theta is typically a filtered heading angle that excludes the heading angle corresponding to the time instances where the angle measurements are noisy. The mathematical representation of the criteria is as follows:

$$\text{Maximum}([w(k), w(k-1), \ldots, w(k-n)]) \leq w_{threshold}$$

$$\text{Maximum}_{headings} - \text{Minimum}_{heading} \leq \text{theta}_{threshold}$$

If so, the mobile object is going along a straight road during the selected segment. Subsequently, step 404 determines the calibrated heading angle by the two position estimates at the beginning and the end of the segment (both of which have higher confidence levels according to the determination of the data length):

$$Pt_{theta(k)} = Pt_{theta(k-1)} = \ldots = Pt_{theta(k-n)} = \operatorname{atan}\left(\frac{P_{y(k)} - P_{y(k-n)}}{P_{x(y)} - P_{x(k-n)}}\right)$$

In step 406, the calibrated heading angle, together with the selected segment of the first past trajectory is used to determine the calibrated past trajectory, for example, by using the backward projection with or without the feedback of the first past trajectory. The projection without the feedback is shown below.

$$\begin{cases} Pt_{x(i-1)} = Pt_{x(i)} - P_{v(i)} \times \cos(Pt_{theta(i)}) \times \Delta t \\ Pt_{y(i-1)} = Pt_{y(i)} - P_{v(i)} \times \sin(Pt_{theta(i)}) \times \Delta t \end{cases}$$

This temporary past trajectory can be regarded as the calibrated past trajectory. Alternatively, a second temporary past trajectory can be generated based on forward projection using the calibrated heading angle and the beginning position of the first past trajectory P(k−n):

$$\begin{cases} Pt2_{x(i-1)} = Pt2_{x(i)} - P_{v(i)} \times \cos(Pt_{theta(i)}) \times \Delta t \\ Pt2_{y(i-1)} = Pt2_{y(i)} - P_{v(i)} \times \sin(Pt_{theta(i)}) \times \Delta t \end{cases}$$

with Pt2(k−n)=P(k−n) as the initial condition. The two temporary past trajectories are then combined (e.g., averaged) to provide the calibrated past trajectory.

In addition, the angular velocity sensor bias can also be estimated or calibrated as the mean value of the angular velocity measurements during the straight-road driving:

$$W_{bias} = \text{mean}([w(k), w(k-1), \ldots, w(k-n)]).$$

Since the angular velocity sensor bias typically changes quite slowly, this estimate can be saved and used to calibrate angular velocity measurement in the generation of calibrated past trajectory at future time instances. This bias estimate can also be feedback to the positioning unit for the estimation of the real-time position. Furthermore, this estimate can be combined with previous estimates of the sensor bias, for example, using weighted combination with forgetting factors, to obtain a more robust estimation of the sensor bias.

Referring back to step 402, if the two criteria are not satisfied, the mobile object is determined to be traveling on curvy roads during the selected segment of the first past trajectory. In step 408, the angular sensor measurements are calibrated based on the first past trajectory. First, the sensor bias is approximately removed by deducting the bias estimate from the angular velocity sensor measurements (or filtered angular velocity sensor measurements):

$$W_{nobias}(i) = Mw(i) - ew, \text{ with } (k-n) \leq i \leq k.$$

Secondly, the sensor gain factor is calibrated based on the heading angle of the first past trajectory; for example, $$\gamma = \frac{(P_{theta(k)} - P_{theta(k-n)})}{\left(\sum_{k-n}^{k}(W_{nobias(i)} \times \Delta t)\right)},$$

where the numerator is the changes in the heading angle from the beginning to the end of selected segment of the first past trajectory and the denominator is the corresponding angle change based on $w_{nobias}$, the angular velocity with bias removed. Thus, the calibrated angular velocity is derived as:

$$W_{calibrated(i)} = \gamma \times w_{nobias(i)} = \gamma(Mw(i) - ew).$$

Subsequently in step 410, the calibrated heading angle can be generated by using and combining forward and backward projection based on the calibrated angular velocity:

$$Pt_{theta(i)} + Pt2_{theta(i)},$$

where $$Pt_{theta(i-1)} = Pt_{theta(i)} - w_{calibrated(i)} \times \Delta t,$$

$$Pt2_{theta(i-1)} = Pt2_{theta(i)} - w_{calibrated(i)} \times \Delta t,$$

with $Pt_{theta(k)} = P_{theta(k)}$ and $Pt2_{theta(k-n)} = P_{theta(k-n)}$.

The calibrated heading angle is then used in step 406 to generate the calibrated past trajectory. For example, two temporary past trajectory can be derived using forward and backward projection based on the simple two-degree-of-freedom kinematic model:

$$\begin{cases} Pt_{x(i-1)} = Pt_{x(i)} - P_{v(i)} \times \cos(Pc_{theta(i)}) \times \Delta t \\ Pt_{y(i-1)} = Pt_{y(i)} - P_{v(i)} \times \sin(Pc_{theta(i)}) \times \Delta t, \end{cases}$$

with $\begin{bmatrix} Pt_{x(k)} \\ Pt_{y(k)} \end{bmatrix} = \begin{bmatrix} P_{x(k)} \\ P_{y(k)} \end{bmatrix}$, and $$\begin{cases} Pt2_{x(i-1)} = Pt2_{x(i)} - P_{v(i)} \times \cos(Pc_{theta(i)}) \times \Delta t \\ Pt2_{y(i-1)} = Pt2_{y(i)} - P_{v(i)} \times \sin(Pc_{theta(i)}) \times \Delta t, \end{cases}$$

with $\begin{bmatrix} Pt2_{x(k-n)} \\ Pt2_{y(k-n)} \end{bmatrix} = \begin{bmatrix} P_{x(k-n)} \\ P_{y(k-n)} \end{bmatrix}.$ and the calibrated past trajectory can be a combination of these two temporary past trajectories, or it can further be combined with the first past trajectory using weighting factors based on confidence levels.

Alternatively, with the calibrated heading angle, the calibrated past trajectory can be generated by using a Kalman-filter-based estimation based on the simple two degree-of-freedom kinematic model or other dynamic models, with the feedback of the positions in the first past trajectory. The feedback gain can incorporate the confidence level of the positions in the first past trajectory as described earlier.

Figure 5A:
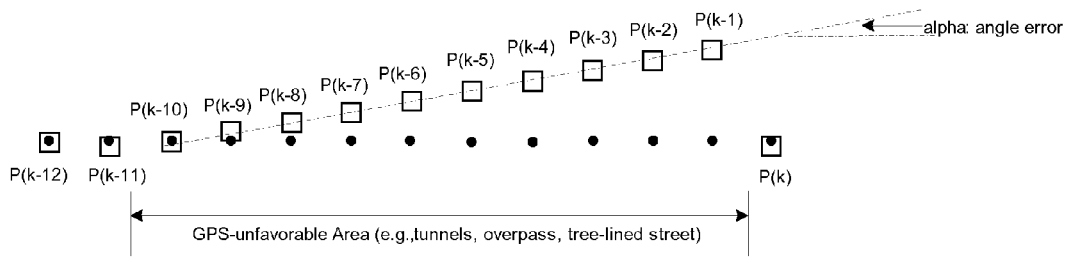
FIGS. 5A and 5B illustrate an example of the generation of a calibrated past trajectory following the flowchart shown in FIG. 4, in a scenario where the mobile object travels along a straight road.
Figure 5B:
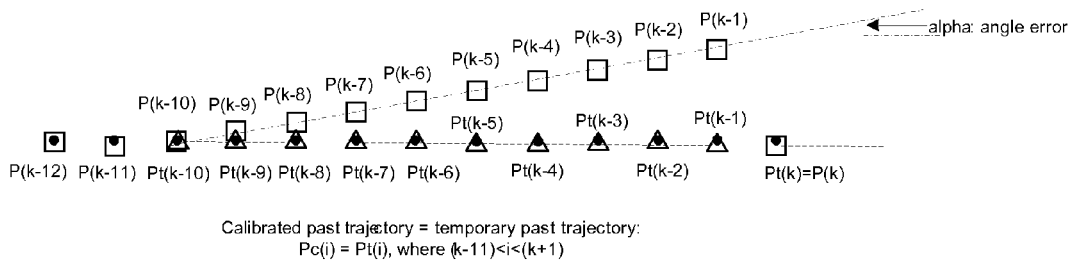

To provide an example to illustrate the generation of the calibrated past trajectory following the flowchart shown in FIG. 4, FIGS. 5A and 5B illustrate a scenario where the mobile object travels along a straight road. In this example, the mobile object enters and exits a GPS unfavorable area (such as tunnels, overpasses, tree-lined streets, as well as the "container canyons" and the areas under the cranes.) at time t(k−10) and time t(k), respectively. In the GPS unfavorable area, the GPS signal is either blocked or has a low quality; therefore, the real-time position estimates P(i) (marked as "□") from time t(k−10) to time t(k−1) typically deviate from the true positions (marked as "•") of the mobile object. For illustration purpose only, FIG. 5A depicts the most typical solution in such cases: the real-time position estimates rely more on the motion sensor measurements including the speed and the angular velocity or an IMU. In this particular scenario, the angular velocity is close to zero as the mobile object is traveling straight. Therefore, the real-time position estimates forms an approximately straight line as shown in FIG. 5A and the orientation of the line relates mostly to the heading angle of the last high-confidence position estimate, which is P(k−11) at time t(k−11) right before the mobile object enters the GPS-unfavorable area. Hence, a small error in the heading angle of P(k−11) could lead to a sizable deviation as the mobile object travels further in the GPS-unfavorable area. It is not until the mobile object gets out of the GPS-unfavorable area at time t(k) that high-quality GPS signals are again available and the real-time position P(k) become more accurate with a higher confidence level.

Since P(k) has noticeably a higher confidence level than P(k−1) and the distance between P(k) and P(k−1) is much larger than the travel distance between time t(k−1) and time t(k) based on speed, the past trajectory estimation will be triggered shortly after P(k) is determined. The data length will be determined to be 11 since P(k−11) is the last high-confidence real-time position estimate before P(k). Following the flowchart in FIG. 2 and FIG. 4, the angular velocity and the heading angle are examined to check whether the two criteria are met in step 402:

Maximum($[w(k),w(k-1), \ldots ,w(k-n)]$)$\leq w_{threshold}$

Maximum$_{heading}$−Minimum$_{heading}$$\leq$theta$_{threshold}$.

In this scenario, both are met since the mobile object is traveling straight. The process then continues to step 404 to determined the calibrated heading angle based on the two high-confidence real-time position estimates P(k) and P(k−11):

$$Pt_{theta(k)} = Pt_{theta(k-1)} = \ldots = Pt_{theta(k-11)} = \operatorname{atan}\left(\frac{P_{y(k)} - P_{y(k-11)}}{P_{x(y)} - P_{x(k-11)}}\right).$$

The calibrated heading angle is then used to determined the temporary past trajectory as described in many of the embodiments before. The temporary past trajectory is shown in FIG. 5B, where the temporary past positions Pt(i) (marked as "Δ") are much closer to the true positions of the mobile object. This temporary past trajectory will be output as the calibrated past trajectory from step 406 (as well as the calibrated past trajectory from step 208 because FIG. 4 shows the process involved in step 208).

Figure 6A:
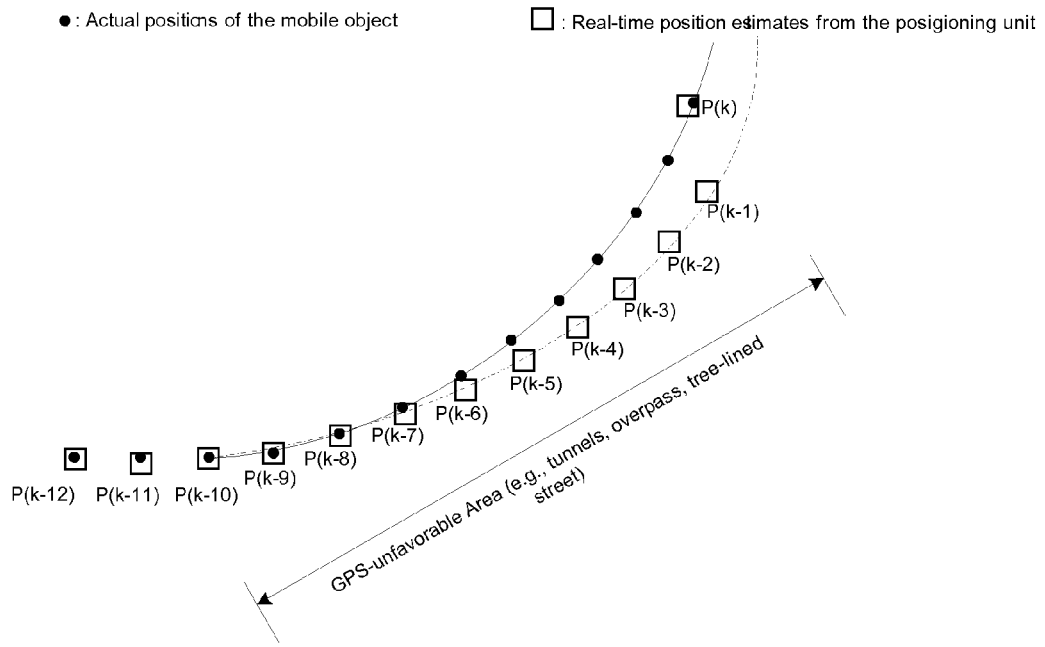
FIGS. 6A and 6B illustrate the generation of the calibrated past trajectory following the flowchart shown in FIG. 4, in a scenario where the mobile object travels along a curvy road.
Figure 6B:
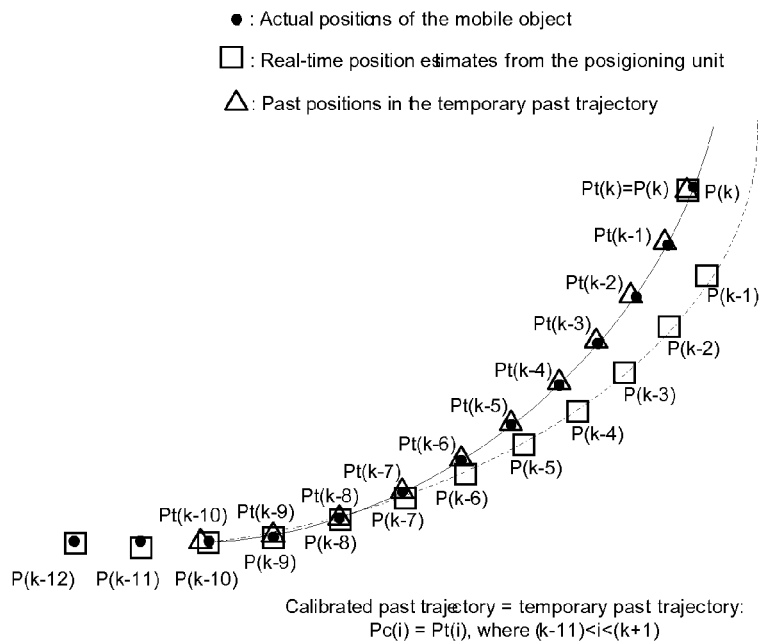

FIGS. 6A and 6B illustrate the generation of the calibrated past trajectory following the flowchart shown in FIG. 4 in a scenario where the mobile object travels along a curvy road. The mobile object enters and exits the GPS-unfavorable area at time t(k−10) and time t(k), respectively. Similarly to the scenario shown in FIG. 5A, the real-time position estimates P(i) from time t(k−10) to time t(k−1) are inaccurate and deviate from the true positions (marked as "•") due to the low-quality GPS signals or even GPS blockage. Once the mobile object gets out of the unfavorable area at time t(k), the real-time position estimate P(k) is more accurate and has a higher confidence level. Similar to that described with FIG. 5A, the past trajectory estimation is triggered in step 202 and the data length is determined to be 11 in step 204. After reading the first past positions from P(k−11) to P(k−1) from the data storage unit in step 206, the process continues to step 208 to determined the calibrated past trajectory based on the first past positions (P(k−11) to P(k−1)) and the most recent position estimate P(k).

In this example, the process in step 208 follows the flowchart shown in FIG. 4. The two criteria are again examined in step 402:

Maximum($[w(k),w(k-1), \ldots ,w(k-n)]$)$\leq w_{threshold}$

Maximum$_{heading}$−Minimum$_{heading}$$\leq$theta$_{threshold}$.

The angular velocity does not satisfy the first criteria since the mobile object is traveling along a curvy road. Thus, the process continues to step 408 to calibrate the angular sensor measurement by first removing the bias (i.e., $w_{nobias(i)}$=Mw(i)−$e_w$) and then calibrating the sensor gain factor based on the high-confidence position estimates in the first past trajectory:

$$\gamma = \frac{(P_{theta(k)} - P_{theta(k-11)})}{\left(\sum_{k-11}^{k} (W_{nobias(i)} \times \Delta t)\right)}.$$

Subsequently, the calibrated angular velocity is as follows:

$w_{calibrated(i)}$=$\gamma \times w_{nobias(i)}$=$\gamma$(Mw(i)−ew) for i=k−1,k−2, k−10.

In step 410, the calibrated heading angle is generated by using forward and backward projection based on the calibrated angular velocity and the heading angle of the high-confidence positions estimates, P_theta(k) and P_theta(k−11):

(Ptheta(i)+Pt2theta(i))/2 for I=k−1,k−2, . . . ,k−10, where $Pt_{theta(i-1)}$=$Pt_{theta(i)}$−$w_{calibrated(i)} \times \Delta t$, and $Pt2_{theta(i-1)}$=$Pt2_{theta(i)}$−$w_{calibrated(i)} \times \Delta t$ with $Pt_{theta(k)}$=$P_{theta(k)}$ and $Pt_{2theta(k-11)}$=$P_{theta(k-11)}$.

The calibrated heading angle is then used to determined the temporary past trajectory as described in many of the embodiments before. As shown in FIG. 6B, with the angular velocity and the heading angle calibrated, the temporary past trajectory Pt(i) (marked as "Δ") are much closer to the true positions (marked as "•") of the mobile object. This temporary past trajectory will be output as the calibrated past trajectory from step 406 (as well as the calibrated past trajectory from step 208 because FIG. 4 shows the process involved in step 208).

D. Embodiment with an Iterative Process to Ensure the Trustworthiness of the Calibrated Past Trajectory FIG. 7 shows the flowchart of another embodiment of the process to generate a calibrated past trajectory based on the first past trajectory. This embodiment further includes steps to execute an iterative process to ensure the generated past trajectory is trustworthy. As shown in FIG. 7, the process in the steps 702 through 708 is similar to that in steps 202 through 208 in FIG. 2; the difference is that the calibrated past trajectory generated in step 708 is further evaluated in step 710 to determine whether the calibrated past trajectory is trustworthy.

D1. Determination of the Trustworthiness of the Calibrated Past Trajectory

The trustworthiness of the calibrated past trajectory indicates how much confidence we can have in the correctness of the calibrated past trajectory. The ideal way to determine the trustworthiness is to compare the calibrated past trajectory with the actual past trajectory; however, this is not implementable in practice since the actual past trajectory is typically not available. An alternative is to compare the calibrated past trajectory with the high-confidence portions of the first past trajectory. For example, the deviation between the high-confidence portions of the first trajectory and the corresponding portions of the calibrated past trajectory in a 2-dimensional example can be computed as:

$$\text{deviation} = \sum_i (\|P(i) - Pc(i)\|) = \sum_i \left( \left\| \begin{matrix} Px(i) - Pcx(i) \\ Py(i) - Pcy(i) \end{matrix} \right\| \right)$$

where $(k-n) \le i \le k$ and $P(i)$ has a relatively high confidence level (i.e., $P\_conf(i)$ is greater than a pre-determined threshold). The deviation can be further divided by the number (m) of high-confidence past positions to compute a normalized deviation:

$$\text{normalized}_{deviation} = \frac{\text{deviation}}{m} = \frac{1}{m} \sum_i (\|P(i) - Pc(i)\|).$$

Accordingly, a match index can be determined as a function of the normalized deviation to indicate how good the calibrated past trajectory matches the higher confidence portions of the first past trajectory: match_index=f(normalized_deviation). The smaller the normalized deviation, the higher the match index is. A simple example is $$\text{match}_{index} = f(\text{normalized}_{deviation}) = \frac{1}{\text{normalized}_{deviation}}.$$

The trustworthiness can then be determined based on the match index, and the higher the match index, the higher the trustworthiness.

Variations can be introduced in the computation of the deviation. For example, the comparison between the calibrated past trajectory and the first past trajectory can include the whole segment with confidence levels involved. Accordingly, a weighted deviation is calculated as $$\text{weighted}_{deviation} = \sum_{k-n}^{k} (g(P_{conf(i)}) \times (\|P(i) - Pc(i)\|)),$$

where $g(P_{conf(i)})$ is a weighting function based on the confidence level Pconf(i), and the higher the confidence level Pconf(i), the larger the weighting function $g(P_{conf(i)})$. A simple weighting function would be $g(P_{conf(i)})$=Pconf(i). Furthermore, outliers can be removed from the computation of the deviation as well; such outliers may include the largest value of $\|P(i) - Pc(i)\|$, where $(k-n) \le i \le k$. The weighted deviation will then be used to compute the normalized deviation, where the denominator will be the sum of the weighting functions instead of m, the number of higher-confidence position estimates.

If the confidence level was not available (e.g., not stored with the real-time position estimate), the trustworthiness can be based on one or several of the following factors: (1) the smoothness of the calibrated past trajectory, (2) the consistency between the travel distance indicated by the calibrated past trajectory and the travel distance indicated by the (filter) speed measurements, and (3) the consistency between the change in the heading angle and the angle change indicated by the (filtered) angular velocity measurements (if they are available). If the confidence level is available, these factors can be combined with the deviation to determine the trustworthiness of the calibrated past trajectory. The smoother the calibrated past trajectory, the higher the trustworthiness. Similarly, the higher the consistency is, the higher the trustworthiness.

The smoothness of the calibrated past trajectory can be determined by treating the calibrated past trajectory as consecutive curves with positions Pc(i) as the joint points. The definition of the smoothness of curves is well-known to those skilled in the art; therefore, only the first-order continuity is described here as an example of how the smoothness of the calibrated past trajectory is evaluated. The first-order continuity means that the curves share a common tangent direction at the join point; that is, the tangent direction of the curve defined by Pc(i) and Pc(i+1) should be the same of the curve defined by Pc(i) and Pc(i−1) if these two curves are smooth in the first order. Therefore, the difference between the tangent direction of the curves can be used to evaluate the smoothness of the calibrated past trajectories as follows.

First, the difference between the tangent directions of any two curves that have a joint point at Pc(i) is calculated.

$$\text{diff}_{tangent(i)} = \left| \left( \frac{Pc_{y(i+1)} - Pc_{y(i)}}{Pc_{x(i+1)} - Pc_{x(i)}} \right) - \left( \frac{Pc_{y(i)} - Pc_{y(i-1)}}{Pc_{x(i)} - Pc_{x(i-1)}} \right) \right|$$

Second, the mean of the differences is calculated for the whole calibrated past trajectory (from Pc(k−n) to Pc(k)), whose joint points include Pc(k−n+1), Pc(k−n+2), . . . , and Pc(k−1).

$$\text{mean}_{diff\_tangent} = \frac{1}{n} \sum_{k-n} \text{diff}_{tangent(i)}$$

A smoothness index can then be computed as a function of the sum of the differences in tangent directions: smoothness$_{index}$=h(mean$_{diff\_tangent}$). The smaller the mean$_{diff\_tangent}$ the higher the smoothness$_{index}$. A simple example is smoothness$_{index}$=h(mean$_{diff\_tangent}$)= 1/mean$_{diff\_tangent}$.

Variations on computing the smoothness index include the use of maximum differences in tangent directions, weighted mean of the differences, and so on.

As described earlier, a second factor that can be incorporated into the determination of the trustworthiness is the consistency between the travel distance indicated by the calibrated past trajectory and the travel distance indicated by the (filtered) speed measurements. The travel distance indicated by the calibrated past trajectory is computed as the sum of the distance between any two consecutive positions in the calibrated past trajectory, and the travel distance indicated by the (filtered) speed measurements can be computed by integrating the (filtered) speed measurements. For example, given the calibrated past trajectory as [P(k), P(k−1), . . . , P(k−n)], this consistency measure could be $$\text{consistency}_{distance} = \frac{\sum_{k-n+1}^{k} (\|Pc(i) - Pc(i-1)\|)}{\sum_{k-n}^{k-1} (Pc_{v(i)} \times \Delta t)}$$

where Pc_v is the calibrated or filtered speed measurements and $\|Pc(i) - Pc(i-1)\|$ is the distance between two consecutive position estimates in the x-y plane:

$$(\|Pc(i) - Pc(i-1)\|) = \left\| \begin{bmatrix} Pc_{x(i)} - Pc_{x(i-1)} \\ Pc_{y(i)} - Pc_{y(i-1)} \end{bmatrix} \right\|.$$

Similarly, the third factor described earlier is the consistency between the change in the heading angle and the angle change indicated by the (filtered) angular velocity measurements (if they are available). The consistency heading measure would be:

$$\text{consistency}_{heading} = \frac{\sum_{k-n+1}^{k}(\|Pc_{theta(i)} - Pc_{theta(i-1)}\|)}{\sum_{k-n}^{k-1}(Pc_{w(i)} \times \Delta t)}$$

where $Pc_{w(i)}$ is the calibrated or filtered angular velocity measurements

Consequently, the trustworthiness can be determined as a function of at least one of the aforementioned factors, including the trajectory deviation (match_index), the smoothness (smoothness_index), and the two consistency measures (consistency_distance and consistency_heading). For example, the trustworthiness can be computed as a weighted sum of the four measures. The higher these indexes or measures are, the more trustable the calibrated past trajectory is.

D2. Iterative Process to Ensure the Trustworthiness of the Calibrated Past Trajectory If in step 710 the calibrated past trajectory is determined to be not trustworthy enough, the process increases the data length n to extend the segment of the first past trajectory that is used to determine the calibrated past trajectory. For example, if the initial data length is determined to be Lmin, the increased data length n (n>Lmin) is the smallest value whose corresponding position estimate (i.e., the first position or, equivalently, the stored previous real-time position estimate/measurement from the positioning unit 102) P(k−n) has a confidence level greater than the pre-set threshold. Alternatively, the previously-set upper bound LN can be increased to LN+Ln, and the data length n can determined so that the stored previous real-time position estimate P(k−n) has the highest confidence level among the stored previous real-time position estimates [P(k−LN), P(k−LN−1), . . . , p(k−LN−Ln)].

In step 716, the process determines whether the increased data length n exceeds a maximum data length Lmax; if not, the process continues to steps 706 and 708 to generate a new calibrated past trajectory with the extended segment of the first past trajectory [P(k), P(k−1), . . . , P(k−n)]. The process will continue executing the iteration loop until (1) the generated candidate past trajectory is deemed trustworthy in step 710 or (2) step 716 determines that the increased data length exceeds the pre-set maximum data length Lmax. In the former case, the process continues to step 712 to set a relevant flag as succeeded (e.g., 1) to indicate that the calibrated past trajectory is trustworthy. In the latter case, the flag is set as failed (e.g., 0) to indicate that the calibrated past trajectory does not meet the trustworthy criteria. Nonetheless, the process may still output the calibrated past trajectory together with the flag to the Data Storage Unit 104 since it may still have higher quality (i.e., more trustworthy) than the first past trajectory (which is formed by the stored previous real-time position estimates. Furthermore, the process could wait at a later time instance to re-conduct the calibration so as to include new incoming real-time position estimates in the first past trajectory. For example, the process could wait till time t(k+m) where the real-time position estimate P(k+m) has a relative high confidence level. At this later time t(k+m), the first past trajectory will further include [P(k+m), P(k+m−1), . . . , P(k+1)], which could help improve the quality of the calibrated past trajectory especially if they are of high quality.

Referring back to step 710, if the calibrated past trajectory is determined to be trustworthy, the process continues to step 712 to set a relevant flag to succeeded (e.g., to 1) to indicate that the calibrated past trajectory is trustworthy. The process can then output the calibrated past trajectory to the Data Storage Unit 104 for storage.

D3. Integration of the Newly Generated Calibrated Past Trajectory with the Calibrated Past Trajectories that are Generated Earlier Alternatively, the process may further include step 720, in which the process further integrates the newly generated calibrated past trajectory with the calibrated past trajectories that were generated earlier. That is, if the past trajectory estimation is triggered at time t(k−2), t(k−1), and t(k), three calibrated past trajectories have already been generated based on three different segments of the first past trajectory: [P(k−2), P(k−3), . . . , P(k−2−L1)], [P(k−1), P(k−2), . . . , P(k−1−L2)], and [P(k), P(k−1), . . . , P(k−L3)]. Correspondingly, the three calibrated past trajectories will be [$Pc_{k-2}$(k−2), $Pc_{k-2}$(k−3), . . . , $Pc_{k-2}$(k−2−L1)] generated at time t(k−2), [$Pc_{k-1}$(k−1), $Pc_{k-1}$(k−2), . . . , $Pc_{k-1}$(k−1−L2)] generated at time t(k−1), and [$Pc_k$(k), $Pc_k$(k−1), . . . , $Pc_k$(k−L3)] generated at time t(k). In other words, these calibrated past trajectories generated at different time instances t(k), t(k−1), and t(k−1)) overlap one another. As a result, there are multiple calibrated past position estimates corresponding to the same time instances. For example, the calibrated past position estimates for time t(k−2) include $Pc_{k-2}$(k−2) that is generated at time t(k−2), $Pc_{k-1}$(k−2) that is generated at time t(k−1), and $Pc_k$(k−2) that is generated at time t(k).

In some embodiments, the process may simply record all these calibrated past trajectories, while in other embodiments, step 720 is included to integrate the newly-generated calibrated past trajectory with the calibrated past trajectories that were generated earlier so that there is only an integrated past trajectory. The integration could be as simple as computing the average of the calibrated past trajectories, or it could further include the trustworthiness of each calibrated past trajectory as weightings to compute a weighted average, or selecting the one with the highest trustworthy index. Some embodiments may simply choose not to process a new calibrated past trajectory for the data segment when its corresponding trustworthiness index exceeds a certain threshold. More complicated data fusion and decision fusion techniques can also be employed. Those techniques are well-known to those skilled in the art; therefore, they are not described here.

Figure 7:
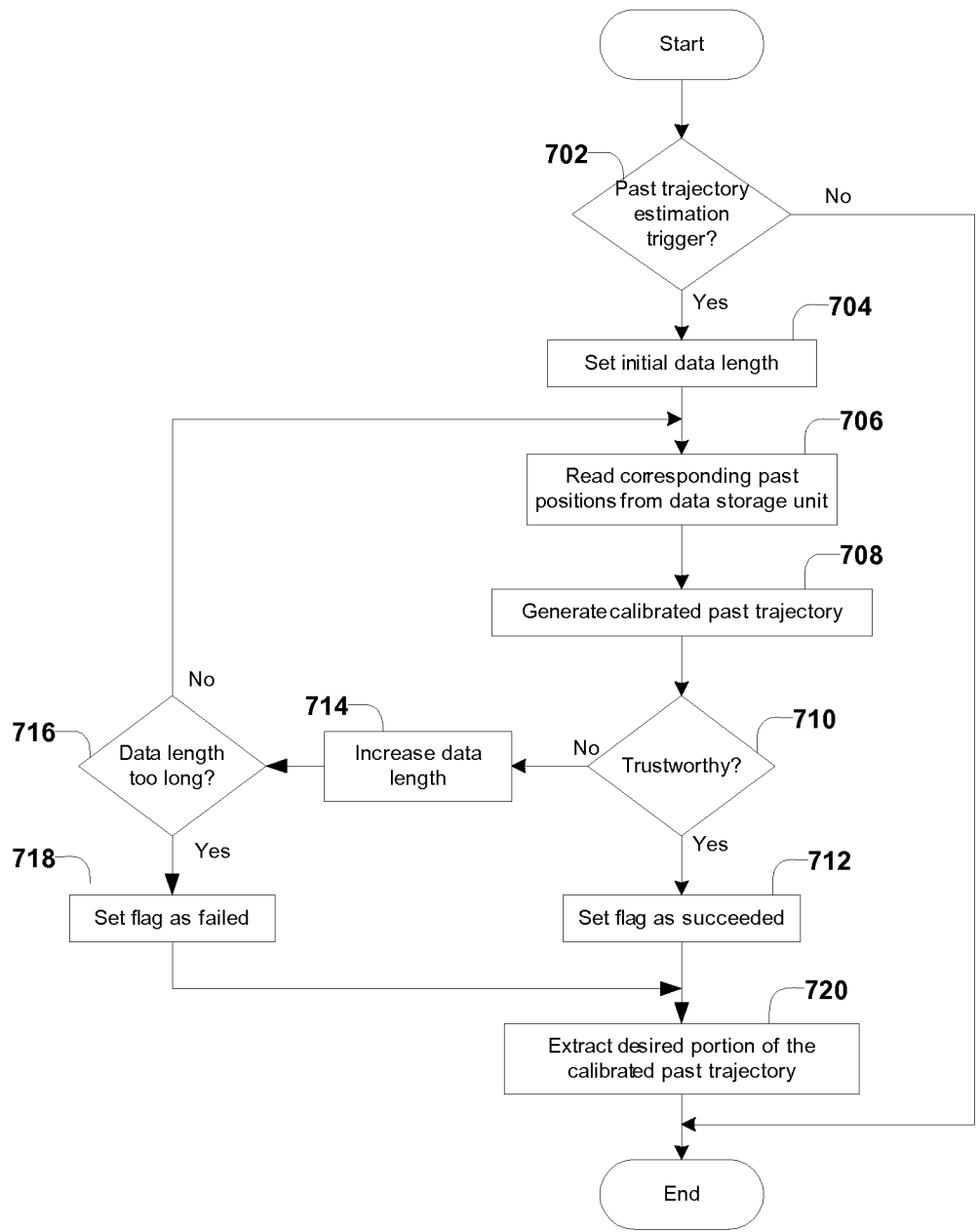
FIG. 7 shows the flowchart of another embodiment of the process to generate a calibrated past trajectory based on the first past trajectory, which further incorporates an iterative process to ensure the trustworthiness of the calibrated past trajectory.

The processes in FIG. 2, FIG. 4, and FIG. 7 show real-time generation of the calibrated past trajectory; that is, a calibrated past trajectory [Pc(k), Pc(k−1), . . . , Pc(k−n)] is generated at time t(k). However, the process can be easier applied to determine the second past trajectory in non-real-time post processing, depending on the needs of the actual application. In such applications, the first trajectory (which includes P(1), P(2), . . . , and P(N)) was stored and the calibrated past trajectory (which includes Pc(1), Pc(2), ..., and Pc(N)) can be generated segment by segment based on the first trajectory.

Figure 8:
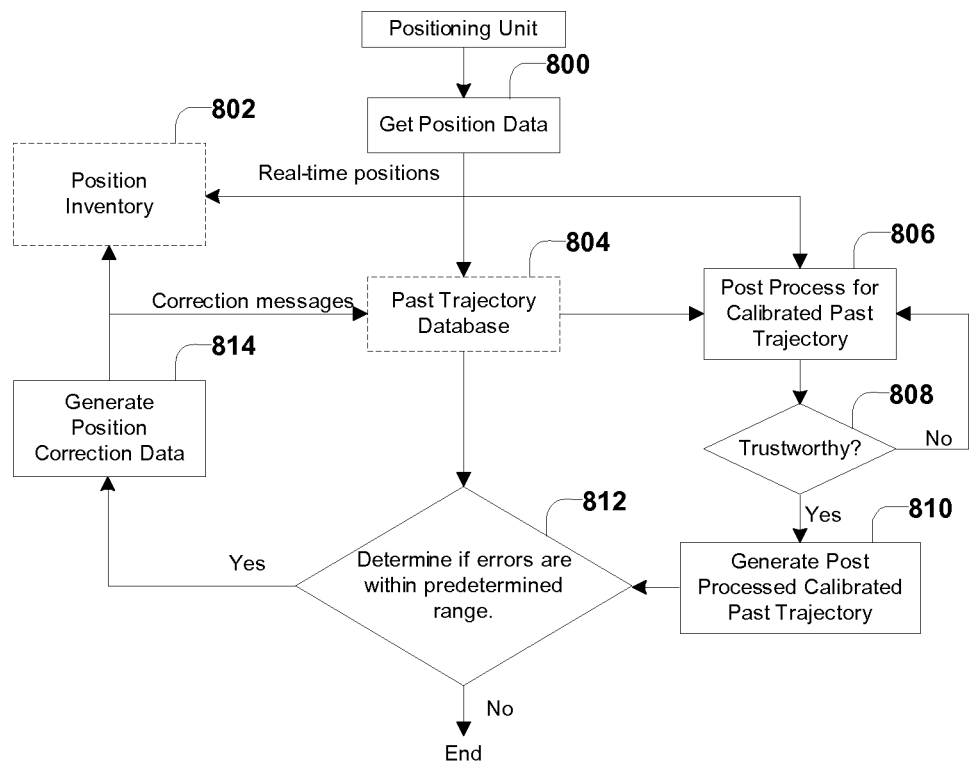
FIG. 8 is a flowchart illustrating basic operation of a method for tracking real-time positions and correcting past trajectory of a mobile object based on the calibrated past trajectory.

E. Embodiments of Position Tracking Systems with Calibration of Past Trajectories And Correction of Past Position Errors FIG. 8 is a flowchart illustrating basic operation of a method for tracking real-time positions and correcting the past trajectory of a mobile object in a real-time fashion. Initially in FIG. 8, real-time data is obtained in step 800 from the positioning unit. The positioning unit typically includes a position sensor such as a GPS sensor or a combination of a positioning sensor and a sensor indicating movement such as an INS or a speed sensor. In one embodiment, the real-time position data also includes confidence level of the real-time position data. The real-time position data is provided from step 800 to a position inventory 802 for storage. (Note dashed lines in FIG. 8 represent a storage device, rather than a method step for FIG. 8. Similar dashed lines will be provided for devices shown subsequently in FIG. 8 as well as in subsequent figures.) The real-time position data is also provided from step 800 to a past trajectory database 804, as shown in dashed lines, to be stored and aggregated to form a first past trajectory. Ideally, this first past trajectory provided to the past trajectory database 804 includes the available position estimates that have been obtained or reported in real time in step 800. The first past trajectory information from database 804 is also used in steps 806 through 812 for determining calibrated past trajectories and identifying trajectory errors. In one embodiment, step 806 includes determination of the trajectory data confidence level when such determinations are available.

To provide a calibrated past trajectory to later enable determining if trajectory errors occurred, in step 806 a calibrated past trajectory is determined based on the first past trajectory information from the past trajectory database 802 by using mathematical filters or estimation formulas that better determine past positions where position errors potentially occur. As described earlier with FIG. 2 to FIG. 7, the estimation formulas may include mathematical terms or parameters that account for the accumulated effects of the noise and errors in the position data. In a further embodiment, the estimation formulas further include noise and error models describing the propagation of the noise and error in the trajectory calibration process. In step 806 the past trajectory can be computed by using post processing techniques to estimate and calibrate the noise and error terms so as to result in a more trustworthy past trajectory. In a further embodiment, step 806 includes fitting the post-processed trajectory by calibrating parameters to match selected segments of the trustworthy past real-time trajectory.

After determining a past calibrated trajectory in step 806, in step 808 the calibrated past trajectory is evaluated, and if this calibrated past trajectory is determined to be unacceptable (i.e., not trustworthy) it is sent back trough an iterative regression process (as described in FIG. 4) to recalculate filtered position data more accurately in step 806 before reevaluation again in step 808. Once the trajectory or a segment of trajectory passes the evaluation in step 808, the process proceeds to step 810 to either directly output the calibrated trajectory or to further integrate the calibrated past trajectory with the calibrated past trajectories generated at earlier time instances (as described with step 720 in FIG. 7) and output the integrated past trajectory.

To determine errors in the first past trajectory, in step 812 the calibrated trajectory from step 810 is compared with the first past trajectory in the past trajectory database 804 to identify errors in the first (past) positions of the first past trajectory. If trajectory errors exceed a predetermined range as determined in step 812, in a further step 814 a correction message is sent to update the position inventory 802. Otherwise after step 812, the error correction process ends for the data gathered in step 800. In one embodiment, the error correction information is further sent from step 814 to update the past trajectory database 804. The above steps are repeatedly performed to correct errors in the past real-time positions as new data is continuously provided by the position sensor.

Figure 9:
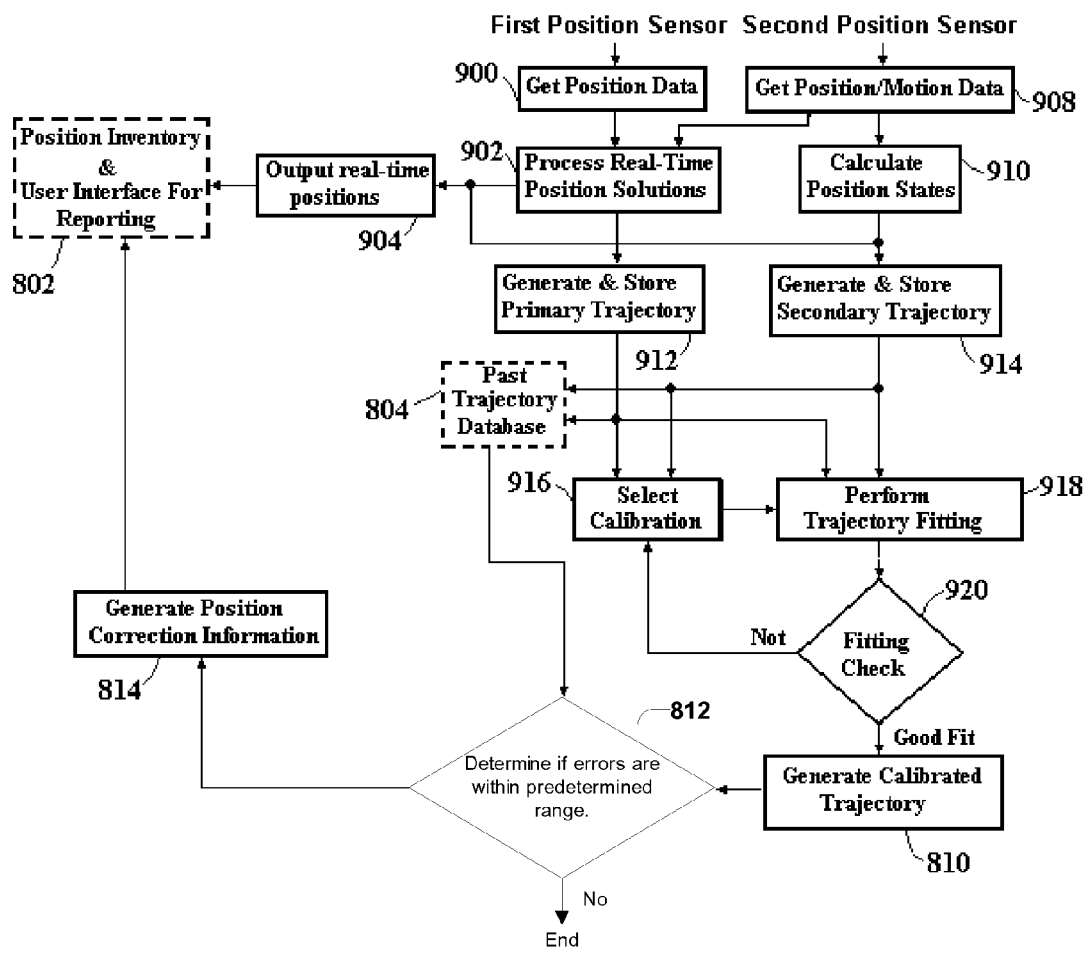
FIG. 9 is a flowchart for a method for tracking real-time positions as modified from FIG. 8 to include two sensors, as well as to describe additional details of calibration and error correction.

FIG. 9 is a flowchart for a method for tracking real-time positions as modified from FIG. 8 to include two types of sensors, as well as to describe additional details of calibration and error correction. Steps carried over from FIG. 8 to FIG. 9 are similarly labeled, as will be steps or components carried forward in subsequent drawings. Initially in FIG. 9, sensor signals are obtained in step 900 from a first position sensor, such as a GPS sensor, and processed in step 902 to provide real-time position data. In one embodiment, the position data includes the confidence level parameters from the position sensor. The real-time position data is then provided from step 902 to a step 904 to output a real-time position to a position inventory 802 for storage. The real-time position solution from step 902 is also provided to step 912, where the real-time position data from step 902 is processed to create a primary motion trajectory that is stored in a past trajectory database 804.

Further, in step 908 a second position sensor is used to collect motion data. The motion data collected can be either in the form of a trajectory, or used in step 914 to calculate the trajectory. In one embodiment, the second position sensor is an INS sensor. In another embodiment, the second position sensor includes inertial sensors and speed or wheel sensors. With the second position sensor, uninterrupted position data can be provided from step 910 when the first position sensor data is blocked or distorted. In addition, the real-time position/motion data from step 908 can be also be output to step 902, which processes it together with the position data from step 900 to determine real-time position solutions.

Once a past trajectory is determined, either in step 912 or step 914, the past trajectory data is stored in the past trajectory database 804 as the first past trajectory. This first past trajectory information can further be provided from steps 912 or 914 to step 918 to enable calibration so as to generate a post-processed calibrated past trajectory within acceptable standards. In one embodiment, the stored trajectory data in step 804 is also used in step 918. A calibrated past trajectory is determined in step 918 using the first past trajectory data described above by using mathematical filters or estimation formulas that better determine past positions when position errors potentially occur. In one embodiment, the estimation formulas include mathematic terms or parameters that account for the effects of the noise and errors in the position data. In further embodiment, the estimation formulas further include noise and error models describing the propagation of the noise effects in the trajectory calibration. In step 918 the calibrated past trajectory is post processed by estimating and calibrating the noise and error terms to result in a more trustworthy past trajectory. In further embodiment, step 918 includes fitting the post processed trajectory by calibrating parameters to better match the calibrated trajectory to the selected segments of trustworthy past real-time trajectory. Calibration criteria, such as calibration data length and segments of trustworthy trajectory, can be determined in step 916 using the first past trajectory information, which includes both the stored real-time positions and the stored real-time motion information provided from the steps 912 and 914.

The calibrated past trajectory generated in step 918 is then evaluated in step 920 to determine if it is within an acceptable trustworthiness region. If not the process goes back to step 916 for recalibration, and then for a re-evaluation in step 918. If the calibrated past trajectory is within an acceptable trustworthiness area after a number of iterations, the process continues to step 810 to either output this calibrated past trajectory to step 812 or alternatively to integrate it with the calibrated past trajectories generated at earlier time instances and then output the integrated past trajectory to step 812.

In step 812, the calibrated past trajectory from step 810 is then compared with the first past trajectory from the past trajectory database 804 to identify errors in the past real-time positions (which form the first past trajectory). If errors are found to be outside acceptable limits in step 812, the process continues in step 814 where the position inventory 802 is updated with the correct past positions in the calibrated past trajectory. Otherwise after the step 812 if errors are not found the process ends. In a further embodiment reporting messages are generated in step 814 to provide to a user display identifying the errors in the past real-time position data.

The method of FIG. 9, thus, provides for continuously tracking and correcting positions and past trajectory of a mobile object using real-time and post-processed positioning algorithms. Although described with certain steps and databases in FIG. 9, it is understood that combinations of steps or variations can be provided. For example, in a further embodiment, the position inventory 802 can include second position data in addition to the first position data, the second position data including the position corrections. In another embodiment, the position inventory 802 is combined with the past trajectory database 804 to store both the real-time positions (as the first past trajectory) and the post-processed calibrated past trajectories. With storage of all trajectory information, the past trajectories can be continuously calibrated using post-processed positioning algorithms and any trustworthy segments of such calibrated past trajectories will be updated in the past trajectory database 804 or the position inventory 802.

Figure 10:
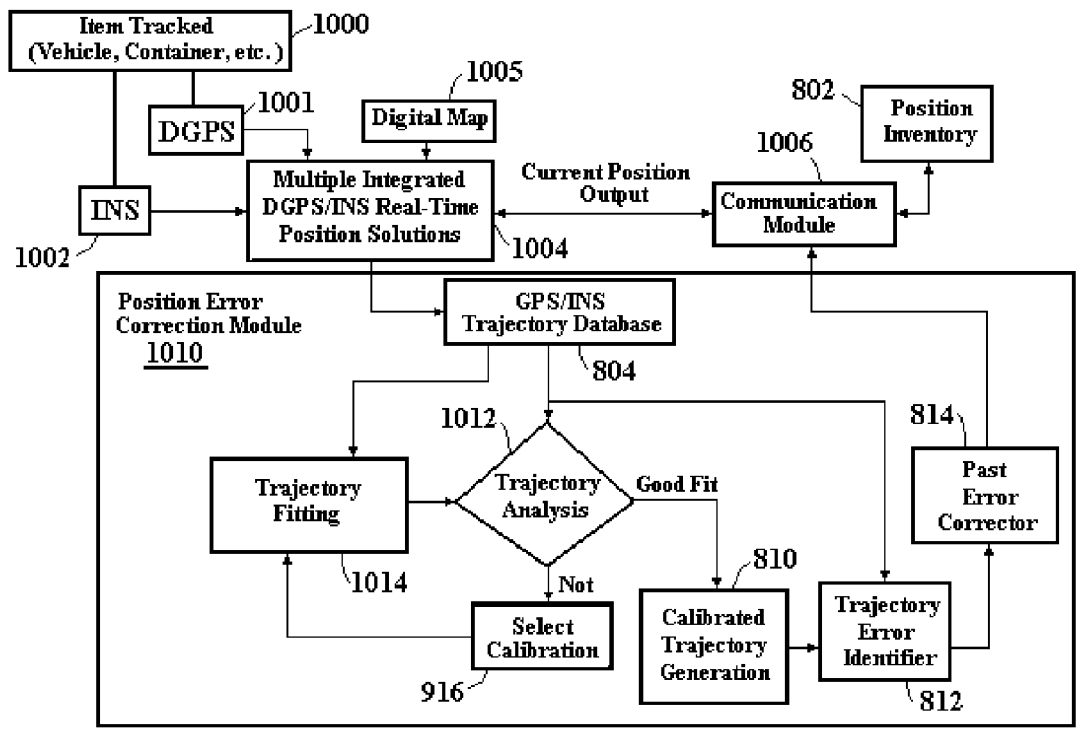
FIG. 10 shows a block diagram of components of a system of the present invention used for correcting and tracking past positions of a mobile object.

FIG. 10 shows a block diagram of components of a system according to an embodiment of the present invention used for correcting and tracking past positions of a mobile object. In this embodiment, the real-time position information is obtained from a first sensor system 1001, shown as a DGPS system 1001, and a second sensor system, shown as an INS system 1002. Although the first sensor 1001 is shown as a DGPS system and the second sensor 1001 is shown as an INS system, it is understood that other motion sensors could be used for embodiments of the present invention. Further, it is contemplated that a single system, such as the DGPS system could be used alone. Figures subsequent to FIG. 10 will reference the first sensor 1001 and second sensor 1002 generally.

The DGPS system 1001 and INS system 1002 can be located on an item tracked 1000 (e.g., a vehicle, a container, etc.), or be located remotely with sensors detecting the position of the item tracked 1000. The DGPS unit 1001 and INS unit 1002 are shown as a tightly coupled DGPS/INS system, with positions and trajectories determined in a combined processor 1004. As an alternative, the GPS unit 1001 and INS unit 1002 may be loosely coupled with separate interacting processors. The real-time position solutions can also be supported by an additional digital map 1005, as shown, or other sensors such as a speed sensor, wheel sensor, or a compass.

The system of FIG. 10 further includes a position inventory 802 that can be a memory device alone, or further include a display for reporting position data and error information. A communications module 1006, which may be simply a memory controller or a more complex processor, is used to provide data to and from the position inventory 802. The communications module 1006 receives position data from DGPS/INS processor 1004, and provides data to the DGPS/INS processor 1004 to enable calculation of trajectories from the position inventory 802.

An error correction module 1010 is provided to correct for errors in the position data, especially for those that were already sent to the position inventory 802. The error correction module 1010 can be formed from a processor, or logic configured for performing the needed tasks, such as an FPGA or an ASIC. The error correction module 1010 can be combined with the processor 1004 in one embodiment of the present invention. The error correction module internally includes memory and modules performing tasks to correct position errors as described to follow.

The position error correction module 1010 initially includes a trajectory database 804 that receives position information from processor 1004. The past trajectory information is sent from past trajectory database 804 to a trajectory analysis module 1012. The trajectory analysis module 1012 determines if any trajectory trustworthiness is within acceptable limits. If not, a calibration step 916 is used to modify the criteria and data segments for the post processed trajectory fitting before the trajectory analysis 1012 is performed again. A trajectory can be determined in step 1014 using mathematical filters or estimation formulas that better determine past positions when position errors potentially occur, as described previously. Once the trajectory analysis module 1012 determines the data is within acceptable limits, a calibrated trajectory is generated in module 810 (if it was not previously generated as part of the trajectory analysis), and a comparator 812 is used to compare the calibrated trajectory with the past trajectory from past trajectory database 804. If the comparison indicates that the past trajectory from 804 is outside acceptable limits, correction information is provided from module 814 back to the communication module 1006. The communications module 1006 then updates the position data in the position inventory 802, and/or alternatively causes the errors to be reported.

Figure 11:
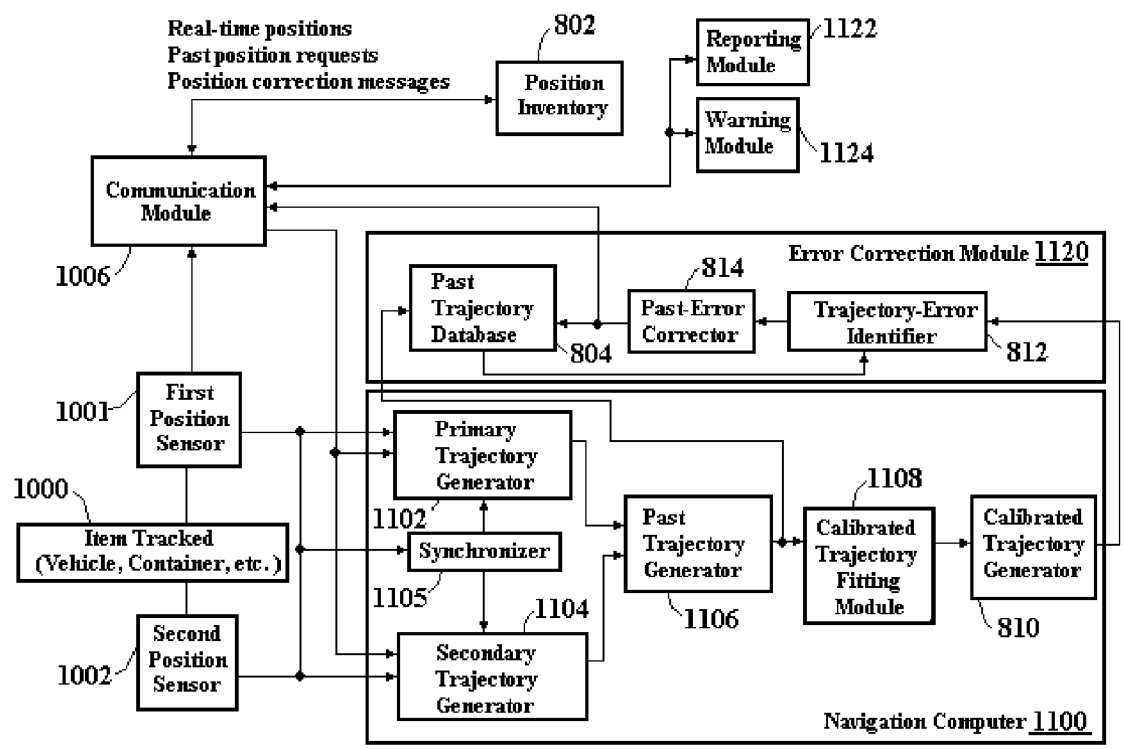
FIG. 11 shows modifications to the system of FIG. 10 to include two sensors and show more details of components for providing past trajectory determination.

FIG. 11 shows modifications to the system of FIG. 10, illustrating the two general sensors 1001 and 1002 along with more details of components for providing past trajectory determination. FIG. 11 further shows how components can be distributed, with a calibrated trajectory being determined using the navigation computer 1100, and with error correction performed in a separate error correction module 1120. The error correction module 1120 can be, thus, located separate from the navigation computer 1100 and potentially not reside on the item tracked 1000, but in a separate stationary location.

To determine trajectories, the navigation computer 1100 includes a primary trajectory generator 1102 connected to receive data from the first position sensor 1001 and possibly from the position inventory 802 through the communication module 1006, enabling calculation of a trajectory of movement for the item tracked 1000. Similarly, the navigation computer includes a secondary trajectory generator 1104 connected to the second position sensor 1002. The secondary trajectory generator is also connected to the position inventory 802 through the communication module 1006 if the second sensor 1002 does not provide motion data. The trajectory generators 1102 and 1104 are synchronized with synchronizer 1105, and provide data for the past trajectory generator 1106. The past trajectory generator 1106 determines if the primary-trajectory data from 1102 is accurate, and if not resorts to include the secondary trajectory generator 1104 to provide trajectories. The past trajectory generator 1106 also provides at least one past trajectory to past trajectory database 804. In one embodiment the past trajectory includes the one including the past position data sent to the position inventory 802. The past trajectory generator 1106 also provides an output to a calibrated trajectory determination module 1108. The module 1108 provides the combined function of modules 1012, 916 and 1014 from FIG. 10, and can be separated into separate modules. The output of module 1108 is then provided to a calibrated trajectory generator 810 if a calibrated trajectory is not already generated.

The error correction module includes the trajectory error identifier 812 that receives a calibrated trajectory data from calibrated trajectory generator 810, as well as a past trajectory from past trajectory database 804, and determines if errors are with acceptable limits. If not, a past error corrector 814 sends a message to communication module 1006, and also sends a corrected update to the past trajectory database 804. The communication module 1006 then functions to update the position inventory 802, and provide error information to a reporting module 1122 and warning module 1124. Note that although the communication module 1006 is used, communication can be directly made, such as between the past error corrector 814 and the warning module 1124. Further, a device, such as a wireless communication device may be included in one embodiment to transfer data between the navigation computer 1100 and the error correction module 1120. In one embodiment, the navigation computer 1100 and error correction module 1120 can be combined. Further, the position inventory can be connected to a user interface to allow viewing of the data as described previously.

Figure 12:
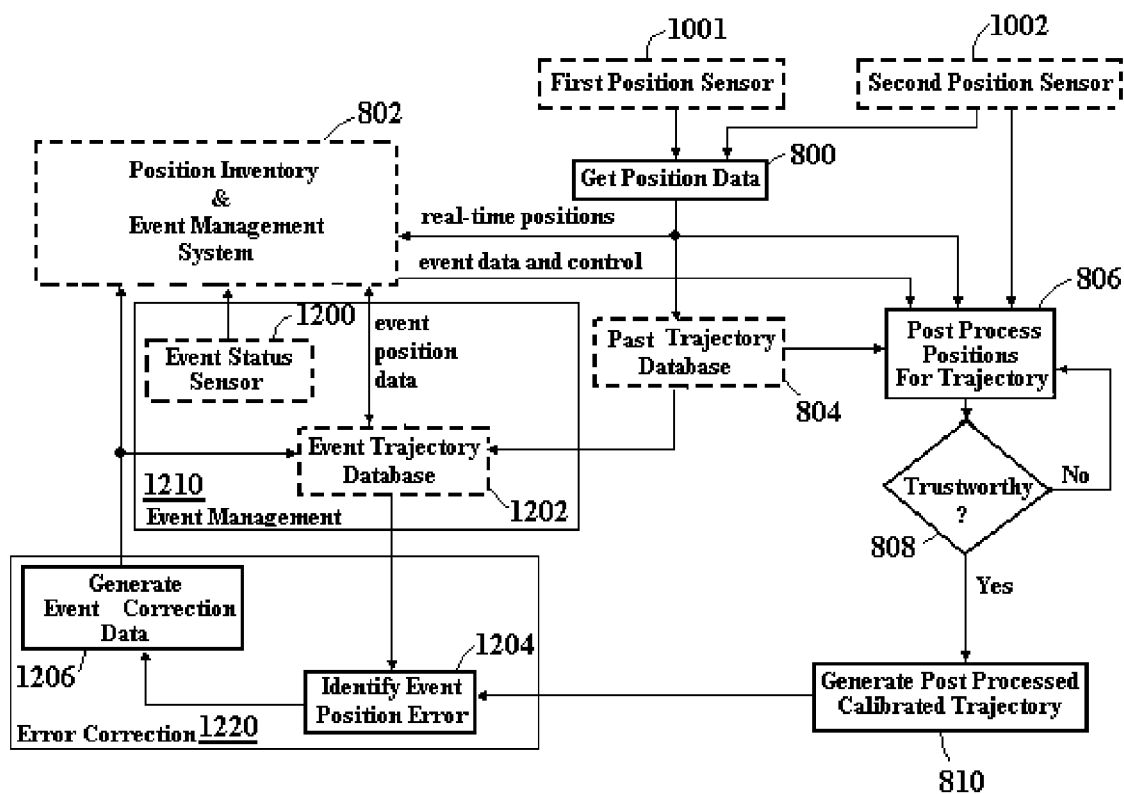
FIG. 12 is a flowchart providing modifications to FIG. 8 to provide error corrections for events occurring after real-time data is acquired that can affect position information.

F. Embodiments of Position Tracking Systems with Calibration of Past Trajectories And Event Management for Correcting Position Errors Associated with Inventory Transaction Events FIG. 12 is a flowchart providing modifications to FIG. 8 to provide error corrections for events associated with the erroneous real-time position data. Recording events in a database can require recording the time, location, type, as well as other properties of the events. Such events could indicate inventory transactions, e.g., picking up a container from a certain location at a certain time, or moving several inventories around different locations. Thus, the accuracy of the events recorded can be sensitive to the accuracy of the position data from the positioning unit or sensor. An event can occur at a time when the positioning unit or sensor provides erroneous data. For example, if a piece of container handling equipment (i.e., the item tracked) has a GPS sensor as a first position sensor 1001 and operates in areas where the surrounding containers blocks GPS reception, the second position sensor 1002, such as an INS sensor, provides the position data. The INS data, however, can deviate significantly from an actual location, particularly the longer the INS system is used without reference to GPS position data. Similarly, the container handling equipment could pick up or drop off a container at a time when signals of the some satellites providing GPS data in a location become unavailable, for example due to blockage or reflection, significantly reducing the accuracy of data that is received. The satellite signals could later come back on line to provide extremely accurate data; however, the real-time position data at the time the event occurs is erroneous, resulting in inaccurate event recording if this position error is not corrected.

To correct errors in the past positions that are associated with an event (e.g., during the pickup or drop off of a container), initially a status sensor 1200 is included to detect the occurrence of an event. The status sensor 1200 can be attached to the item being tracked or be attached where the first position sensor 1001 is located or where the event can be observed. An example of the status sensor could be (mechanical, electrical, or optically) switches on a container handling equipment, which changes their status when the container handling equipment releases or locks onto a container (indicating the event of dropping off or picking up a container, respectively). The status sensor 1200 further alert a user interface or controller provided with a position inventory 802 to indicate when an event occurs; the position inventory 802 further associates the event with the position data obtained at the same time the event occurred, thereby recording the event.

The position inventory and event management system 802 also responds to the alert of the status sensor 1200 by providing a first event trajectory to the event trajectory database 1202. In some embodiments, this first event trajectory simply includes the event information together with its corresponding position data. In some other embodiments, the first event trajectory further include the position data corresponding to time instances before the time of the event; that is, the first event trajectory includes the position data corresponding to a duration of time from t(k−n) to t(k), where t(k) is the time the event occurred and (n+1) is the duration. In further embodiments, the first event trajectory could include the position data corresponding to time instances both before and after the time of the event; for example, the first event trajectory includes the position data corresponding to a duration of time from t(k−n) to t(k+n), where t(k) is the time the event occurred and (2n+1) is the duration. In such embodiments, the position inventory and event management system 802 actually waits after the event to provide the first trajectory at t(k+n) so as to include the position data after the event in the first event trajectory. The embodiments where the position inventory 802 provides the event with only the position data corresponds to the event can be treated as special cases of the alternative embodiments where n equals 0, the duration is 1, and the first event trajectory is simplified as a simple point. This first event trajectory may contain erroneous past position data. In one embodiment, the event trajectory database 1202 is combined with the past trajectory database 804, although they are separated in FIG. 13 for purposes of illustration.

To correct any errors in the first event trajectory so as to ensure the accuracy of the event recording, the position inventory and event management system 802 further sends the first event trajectory to step 806 for purposes of calibration to provide a post processing of the first event trajectory. Calibrated position data is then generated in an iterative or regression process in steps 806 and 808, and a calibrated event trajectory for the event is generated in step 810. The generation of the calibrated event trajectory follows similar processes as those described earlier for the generation of the calibrated past trajectories. In embodiments where the first event trajectory contains a single point (i.e., the position data at the time the event occurs), the step 806 will determined the length of the first past trajectory and read it from the past trajectory database 804 as described earlier.

Figure 13:
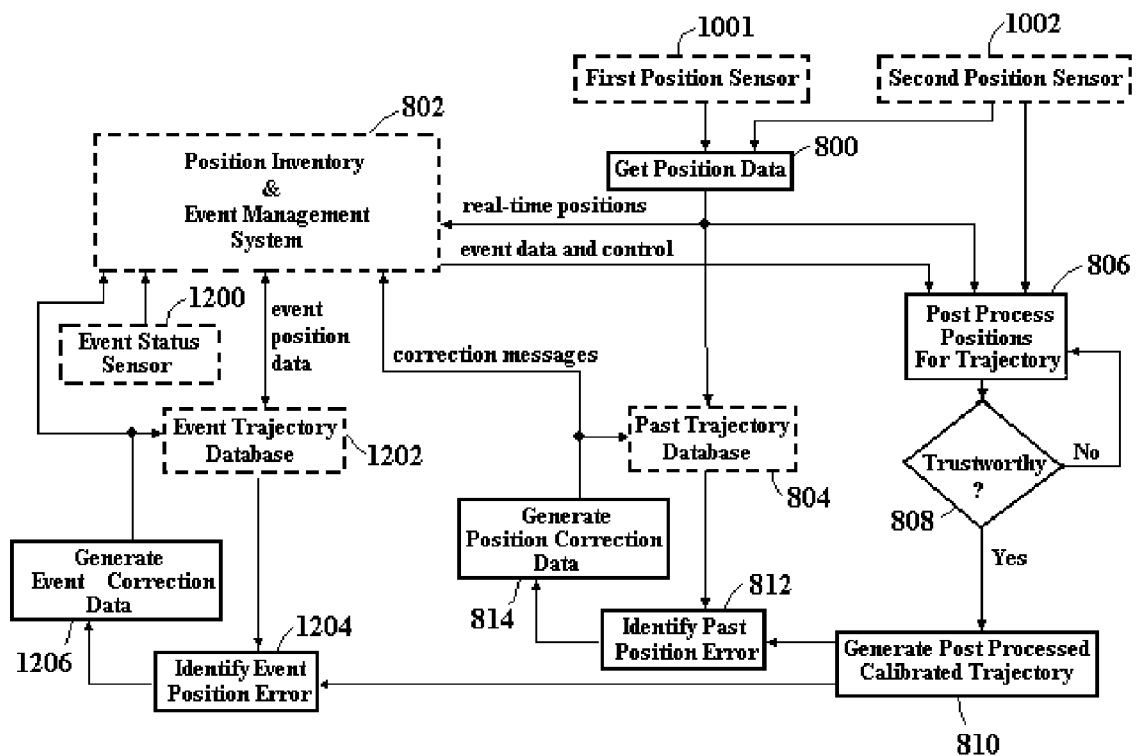
FIG. 13 shows the combination of the system of FIG. 8 and the system of FIG. 12 to provide both past position correction as described in the method steps of FIG. 8 and event error correction as described in the method steps of FIG. 12.

In FIG. 13, steps 1204 and 1206 are provided for evaluation of the calibrated event trajectory with the first event trajectory to identify errors in the first event trajectory and generate correction data for correcting the errors in the position inventory and event management system 802. In one embodiment, the steps 1204 and 1206 are combined with respective steps 812 and 814 that perform the same function for correcting position data as the real-time position data being gathered, the steps operating concurrently. In step 1204, the first event trajectory (which contains the real-time positions collected when the event occurred) from the event trajectory database 1202 are compared with the calibrated event trajectory from step 810 to identify errors in the first event trajectory. If the errors identified are greater than acceptable limits in step 1204, the calibrated past trajectory from step 810 is used in step 1206 to provide position correction data to the position inventory 802 and to the event trajectory database 1202. In one embodiment, the position correction data simply include the second past position in the calibrated event trajectory which corresponds to the time instance of the event, and this second past position is reported to the position inventory 802 as the corrected position data associated with the event. In another embodiment, the position correction data can include all second past positions that corresponds to the time instance where the errors exceed the acceptable limits.

The position inventory and event management system 802 continues sending first event trajectories that are associated with events for calibration until all the event trajectories have been checked and determined to be within acceptable limits. In one embodiment, rules and logics for event retracing are used in step 802 to optimize the event-associated trajectory data checking when potential propagation of inventory errors occurs. The above description describes the operation of the correction of event errors in real time; the process can be easily applied to off-line or post-processing operations as well.

FIG. 13 shows the combination of the system of FIG. 8 and the system of FIG. 12 to provide both past position correction as described in the method steps of FIG. 8 and event error correction as described in the method steps of FIG. 12. In this embodiment, the correction of event position errors is executed in parallel with the correction of past position errors. That is, the system in FIG. 13 calibrates the past trajectories regardless an event has been detected or not, as described in the method steps of FIG. 8; in addition, the system in FIG. 13 also receives and processes event trajectories to generate calibrated event trajectory for correction of erroneous position data associated with events, as described in the method steps of FIG. 12. The description of the method steps of FIG. 8 and those of FIG. 12 shall make the method steps of FIG. 13 easily understandable to those skilled in the art.

Figure 14:
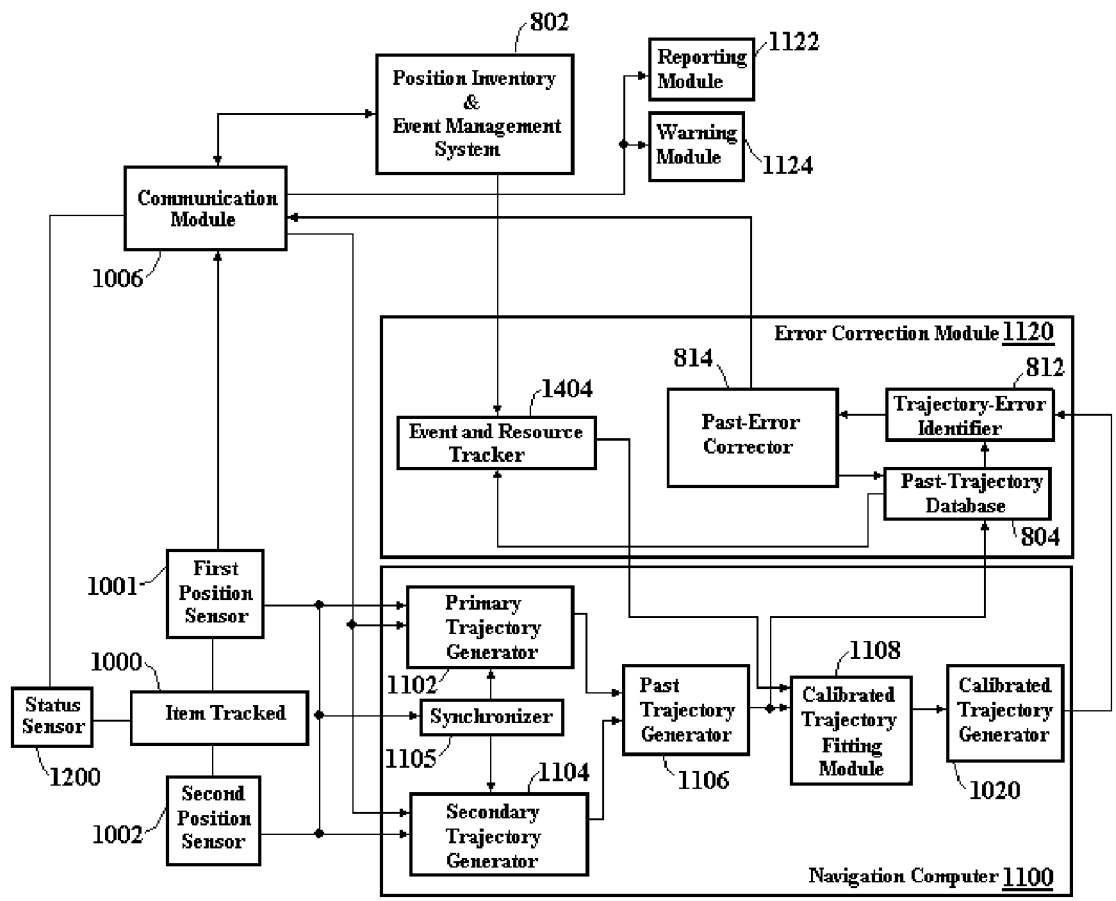
FIG. 14 shows the system of FIG. 11 modified to provide event error correction as described in the method steps of FIG. 13.

FIG. 14 shows the system of FIG. 11 modified to provide event error correction as described in the method steps of FIG. 13. The system of FIG. 11 is modified to include a status sensor 1200 to detect events, and to include an event and resource tracker 1404 to enable correction of the event-associated position or trajectory data. The past trajectory database 804 provides the combined function of the event trajectory database 1202 and past trajectory database 804 of FIG. 13, although they could be separated. Similarly, the trajectory error identifier 812 serves to identify errors in both the first past trajectory as well as errors in the first event trajectory (which could include only one position corresponding to a specific event), although a separate event error identifier could be used in addition to the trajectory error identifier 812 as described with FIG. 13.

In operation, once an event is detected by status sensor 1200, the position inventory and event management 802 operates the event and resource tracker 1404 to reprocess data received during the event. The event and resource tracker 1404 then provides the first event trajectory to module 1108 for calibration. As described with FIG. 13, the first event trajectory comprises the event information and the position data associated with the detected event in some embodiments, and in some other embodiments it comprises the event information as well as the position data associated with a duration of time that include the time the event occurs. The resulting errors are then detected through modules 1020, 812, and 814, and the correction data is returned to the communication module 1006, which transmits the correction data to the position inventory and event management system 802.

In one embodiment, the event and resource tracking 1404 also schedules event retracing procedure for correcting an error that has already propagated to create additional inventory errors. For example, the real-time position data indicates that a container drop-off event occurred at position A at time t1 and no event has been reported at position A afterwards, but an operator found no container at position A at a later time t2 when he or she is instructed to pick up the container there. The operator then reports an error has occurred during the drop-off event at time t1; accordingly, the event and resource tracking module 1404 can schedule a retracing procedure to identify the error. In such cases, the event and resource tracking module generates a first event trajectory by extracts the information about the drop-off event at time t1 as well as the related position data before and after time t1, submit the first event trajectory to module 1108 for calibration, and identify and correct the errors through steps 1020, 812, and 814. As with FIG. 11, in FIG. 14 components in the navigation computer 1100 and event correction module 1120 can be combined into a single unit or distributed to best serve particular design requirements.

Figure 15:
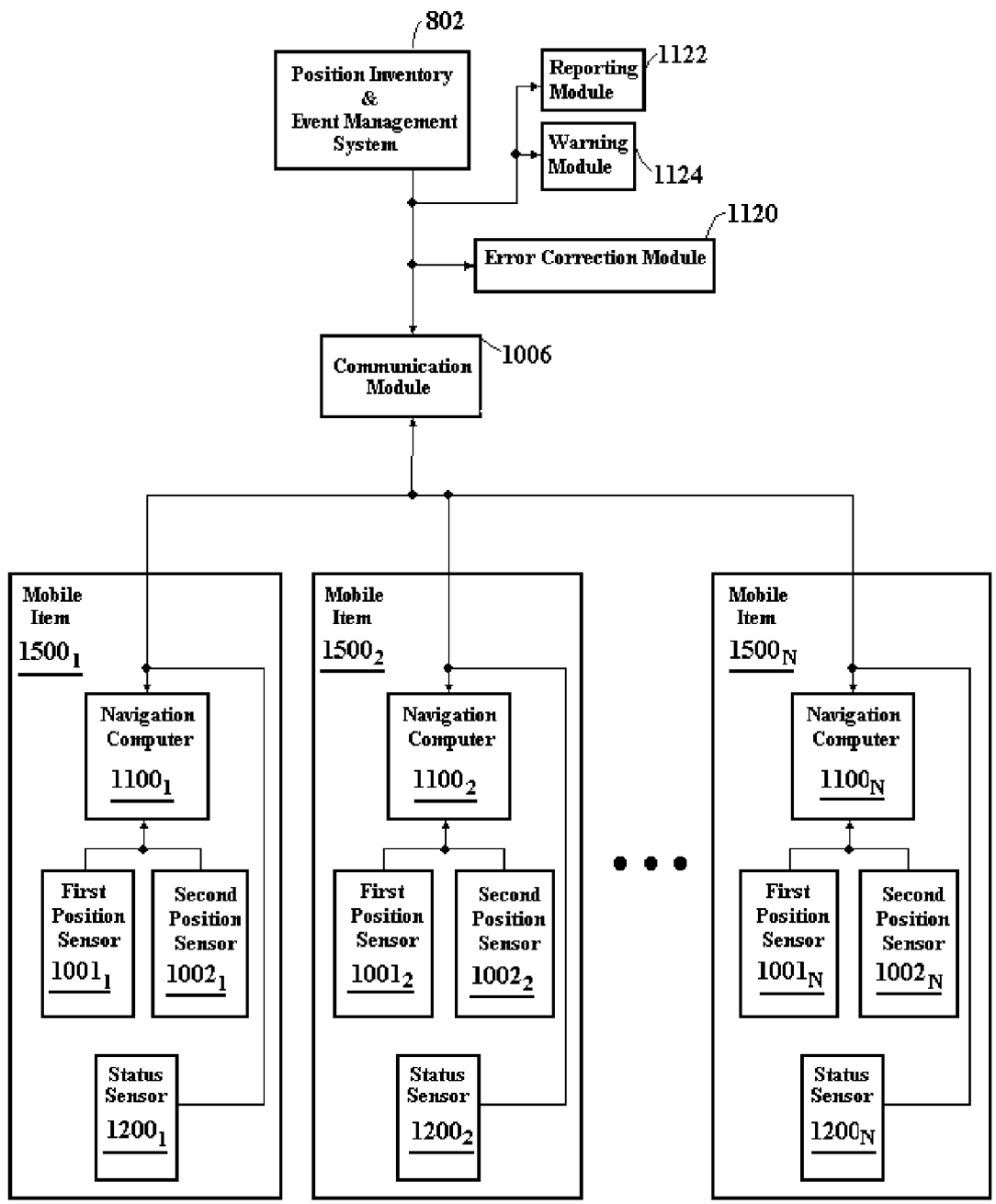
FIG. 15 shows a block diagram of a system architecture for tracking multiple mobile items and correcting for position errors according to the present invention.

FIG. 15 shows a block diagram of a system architecture for tracking multiple mobile items $1500_1$-$1500_N$, and correcting for position errors according to another embodiment of the present invention. The mobile items $1500_1$-$1500_N$ each include components shown from FIG. 14, although it is understood that some components, such as the navigation computers $1100_1$-$1100_N$, can be combined and moved off of the mobile items $1500_1$-$1500_N$ into a separate stationary unit. Similarly, stationary components shown in FIG. 15, such as the inventory and event error correction module 1120, can be separated and included on each mobile item $1500_1$-$1500_N$. In FIG. 15, tracking and error correction components are shown in block diagram from FIG. 14, although it is understood that more limited components, such as those in FIG. 8, could be used.

Although the present invention has been described above with particularity, this was merely to teach one of ordinary skill in the art how to make and use the invention. Many additional modifications will fall within the scope of the invention, as that scope is defined by the following claims.

What is claimed is:

1. A method for calibrating past position estimates from a positioning system that provides real-time position estimates of a mobile object, comprising storing the real-time position estimates as first past positions and aggregating the first past positions to form a first past trajectory, wherein the first past trajectory comprises at least three first past positions;

generating a calibrated past trajectory based on the first past trajectory, wherein the calibrated past trajectory comprises second past positions and at least one of the second past positions is determined by using at least one of the first past positions that corresponds to an earlier time instance;

whereby the second past positions are closer to actual past positions of the mobile object than the first past positions and the calibrated past trajectory is closer to the actual past trajectory of the mobile object than the first past trajectory.

2. The method in claim 1, wherein the positioning system provides the real-time position estimates by computing at least a pair of position values corresponding to the mobile object's position in a two-degree-of-freedom coordinate system, a heading angle corresponding to traveling direction of the mobile object, and a traveling speed of the mobile object.

3. The method in claim 1, wherein the generation of the calibrated past trajectory further comprises computing at least one temporary past trajectory based on mathematical models that depict movement of the mobile object and combining the temporary past trajectories with the first past trajectory to generate the calibrated past trajectory.

4. The method in claim 1, wherein the generation of the calibrated past trajectory involves at least one of the following:
  employing models that depict movement of the mobile object, wherein at least one model takes the first past positions as input;
  applying estimation formulas that include mathematic terms accounting for accumulated effects of noise and errors in the first past positions;
  estimating and reducing noise and errors by modeling the noise and errors as well as propagation of the noise and errors in trajectory calibration process; and
  fitting the calibrated past trajectory to selected segments of the first past trajectory by calibrating parameters.

5. The method in claim 1, wherein the generation of the calibrated past trajectory further comprises iterations of computing temporary past trajectories until the temporary past trajectories satisfy pre-determined criteria, wherein
  the first iteration determines a first temporary past trajectory based on the first past trajectory;
  each subsequent iteration uses the temporary past trajectory determined in the preceding iteration as an input to determine a subsequent temporary past trajectory; and
  the temporary past trajectory determined in the last iteration is the calibrated past trajectory.

6. The method in claim 1, wherein the generation of the calibrated past trajectory further comprises
  selecting a segment of the first past trajectory, wherein the segment has a length smaller or equal to length of the first part trajectory;
  computing a calibrated past trajectory based on the selected segment of the first past trajectory, wherein the calibrated past trajectory corresponds to same time instances as the segment of the first past trajectory.

7. The method in claim 1, wherein the positioning system further provides a confidence level indicating accuracy and trustworthiness for each of the first past positions; and the generation of the calibrated past trajectory further incorporates the confidence levels of the first past positions, whereby the first past positions that have higher confidence levels have more effects on the generation of the calibrated past trajectory.

8. The method in claim 2, wherein
  each first past position further comprises an angular velocity of the mobile object; and
  the generation of the calibrated past trajectory further comprises calibrating the heading angle of the first past positions based on the angular velocity and using the calibrated heading angle to compute the calibrated past trajectory.

9. The method in claim 8, wherein the calibration of the heading angle further comprises estimating and approximately removing noise and errors in at least one of the following: the heading angle and the angular velocity of the mobile object.

10. The method in claim 9, wherein
  the noise and errors comprise a bias and a gain offset in the angular velocity, as well as an error in the heading angle of at least one of the most recent first past position and the earliest first past position, and
  the noise and errors are estimated by formulating an optimization problem and employing optimization techniques to determine estimates of the noise and errors.

11. The method in claim 8, wherein the calibration of the heading angles further comprises
  determining whether the mobile object was moving along a straight road or a curvy road based on the angular velocity in the first past positions and
  fitting the calibrated past heading angles to the heading angles in the first past positions, wherein
  when the mobile object is determined to be moving along a straight road, the calibrated heading angles are determined based on the heading angles in both the most recent first past position and the earliest first past position in the selected segment,
  when the mobile object is determined to be moving along a curvy road, the calibrated heading angles are determined based on calibrated angular velocities, wherein the calibration of the angular velocity comprises determining a gain offset in the angular velocity computing a change in heading angle based on bias-removed angular velocities, and comparing the change with a difference between the heading angle of the most recent first past position and the heading angle of the earliest first past position.

12. The method in claim 1, wherein the generation of the calibrated past trajectory further comprises an iterative process including:
  selecting a segment of the first past trajectory;
  computing a calibrated past trajectory based on the selected segment of the first past trajectory, wherein the calibrated past trajectory corresponds to same time instances as the segment of the first past trajectory and at least one of the second past positions is determined by using at least one of the first past positions that corresponds to an earlier time instance;
  evaluating the trustworthiness of the calibrated past trajectory; and outputting the calibrated past trajectory if the calibrated past trajectory is determined to be trustworthy in the evaluating step, or extending the segment of the first past trajectory to include more first past positions if the evaluating step determines the calibrated past trajectory is not trustworthy and continuing to next iteration to re-compute the calibrated past trajectory until one of the following criteria is met: the calibrated past trajectory is trustworthy or a pre-defined number of iterations has been executed,
  whereby when one of the criteria is met, a last one of the iterations is output as the calibrated past trajectory.

13. The method in claim 12, wherein the trustworthiness of the calibrated past trajectory is determined based on at least one of the following indexes:
  a deviation index that indicates differences between the first past trajectory and the calibrated past trajectory;
  a smoothness index that indicates smoothness of the calibrated past trajectory;

a first consistency index that indicates consistency between a first travel distance based on the first past trajectory and a second travel distance based on the calibrated past trajectory; and a second consistency index that indicates consistency between a first heading angle change based on the first past trajectory and a second heading angle change based on the calibrated past trajectory.

14. The method in claim 12, wherein the generated calibrated past trajectory is further integrated with calibrated past trajectories generated at earlier time instances to form an integrated past trajectory.

\* \* \* \* \*